United States Patent
Kessler et al.

(10) Patent No.: US 6,373,526 B1
(45) Date of Patent: Apr. 16, 2002

(54) PROCESSING OF CLOSED CAPTION IN DIFFERENT FORMATS

(75) Inventors: Damien Kessler, San Jose; Mario Brotz, Mountain View, both of CA (US)

(73) Assignees: Sony Corporation, Tokyo (JP); Sony Electronics Inc., Park Ridge, NJ (US)

(*) Notice: Subject to any disclaimer, the term of this patent is extended or adjusted under 35 U.S.C. 154(b) by 0 days.

(21) Appl. No.: 09/272,897

(22) Filed: Mar. 19, 1999

(51) Int. Cl.$^7$ ............................................. H04N 11/00
(52) U.S. Cl. ......................... 348/468; 348/563; 348/564
(58) Field of Search ................................ 348/468, 465, 348/467, 461, 563

(56) References Cited

U.S. PATENT DOCUMENTS

| | | | |
|---|---|---|---|
| 5,202,669 A | | 4/1993 | Ishimochi et al. ............ 340/721 |
| 5,500,680 A | * | 3/1996 | Lee ............................... 348/468 |
| 5,543,851 A | * | 8/1996 | Chang ........................... 348/468 |
| 5,555,025 A | * | 9/1996 | McArthur ...................... 348/468 |
| 5,576,768 A | * | 11/1996 | Gomikawa ..................... 348/468 |
| 5,794,234 A | | 8/1998 | Church et al. ................... 707/4 |
| 5,805,173 A | * | 9/1998 | Glennon et al. ............... 348/468 |
| 5,828,402 A | | 10/1998 | Collings ........................ 348/5.5 |
| 6,072,532 A | * | 6/2000 | Chieh et al. ................... 348/468 |
| 6,097,442 A | * | 8/2000 | Rumreich et al. .............. 348/563 |

FOREIGN PATENT DOCUMENTS

| | | |
|---|---|---|
| EP | 0 112 700 A | 7/1984 |
| EP | 0717 439 A | 6/1996 |
| JP | 08 129360 A | 5/1996 |
| JP | 08 241057 A | 9/1996 |
| WO | WO 96 06456 A | 2/1996 |

OTHER PUBLICATIONS

"Eia Standard; Advanced Television Closed Captioning; EIA–708", Electronic Industries Association, Jul. 1997.

* cited by examiner

Primary Examiner—Reinhard J. Eisenzopf
Assistant Examiner—Trang U. Tran
(74) Attorney, Agent, or Firm—Skjerven, Morrill MacPherson LLP; Michael Shenker

(57) ABSTRACT

A closed caption decoder includes circuitry for processing closed caption according to the Electronic Industries Association EIA-708 and EIA-608 standards. The EIA-708 memory buffers (48) store caption data both for the EIA-708 and the EIA-608 standards. Therefore, the decoder memory requirements are reduced.

12 Claims, 19 Drawing Sheets

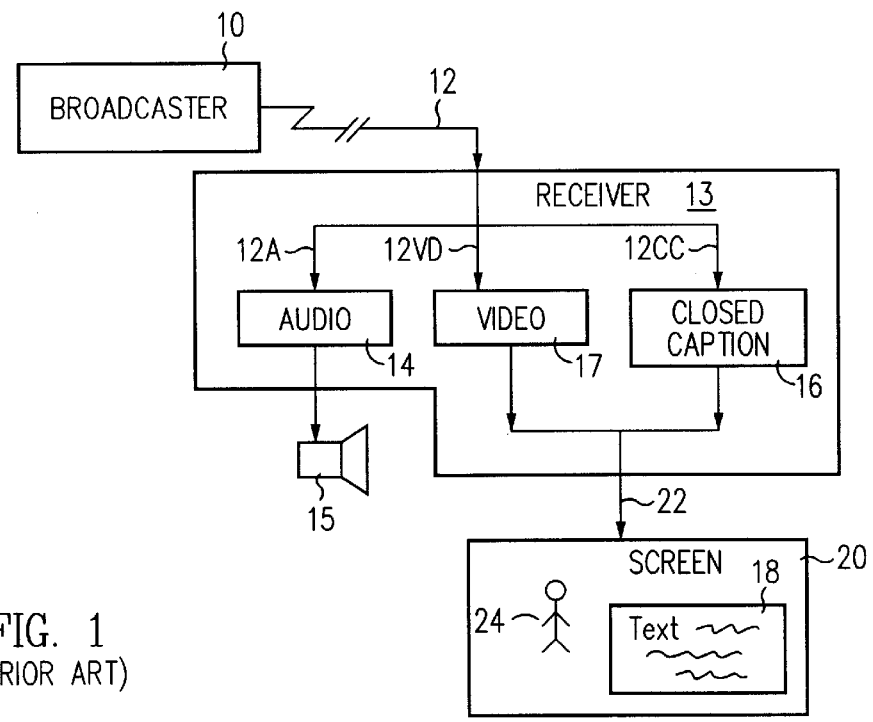
FIG. 1
(PRIOR ART)
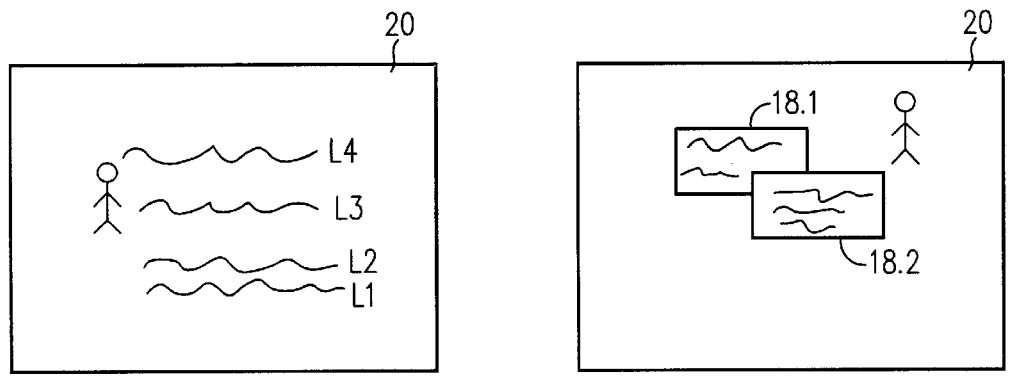
FIG. 2
(PRIOR ART)
FIG. 3
(PRIOR ART)

B1

PROCESSING OF CLOSED CAPTION IN DIFFERENT FORMATS

FIELD OF THE INVENTION

The present invention is related to processing of closed caption data.

RELATED ART

Closed caption is displayed on a television screen during a TV broadcast in order to help the hearing impaired to understand the words spoken in the broadcast, or to translate the broadcast to another language, or to display announcements or advertising, or for some other purpose. The processing of the closed caption data is illustrated in FIG. 1. A broadcaster 10 transmits a television signal 12. Signal 12 is picked up by a television receiver 13. Receiver 13 is part of a television set, or is a set-top top box attached to a television set. Receiver 13 extracts the audio data 12A, the video data 12VD, and the closed caption data 12CC from signal 12. The audio data 12A are provided to audio circuit 14. The audio circuit performs suitable processing and provides an audio signal to television speaker 15.

The video signal 12VD is processed by a video decoder 17. The closed caption signal 12CC is processed by a closed caption decoder 16. The outputs of video decoder 17 and closed caption decoder 16 are combined, and the combined signal 22 is provided to a cathode ray tube (not shown) that drives television screen 20. The combined signal 22 causes the television screen to display the closed caption in a window 18. (In FIG. 1, screen 20 contains a human FIG. 24 representing an image carried by video signal 12VD.)

Different standards have been proposed for processing the closed caption data. One such standard, for analog television, is described in Chapter 1 of 47 CFR (Code of Federal Regulations), 1997, incorporated herein by reference. This standard is also known as EIA-608. "EIA" stands for Electronic Industries Association. According to the standard, the screen 20 (or, rather, a "safe caption area" of the screen 20) is subdivided into 15 rows. A caption may contain up to four rows L1, L2, L3, L4 (FIG. 2). Each of these rows can be displayed in any one of the 15 rows of the safe caption area. The rows need not be contiguous.

FIG. 3 illustrates closed caption displayed according to a later standard EIA-708 described in "EIA Standard; Advanced Television Closed Captioning; EIA-708" (Electronic Industries Association, Engineering Department, July 1997), incorporated herein by reference. This standard (the "708 standard") is designed for digital TV. The 708 standard allows a number of caption windows to be displayed on the screen at any given time. Two windows 18.1, 18.2 are shown in FIG. 3. Each window may have one or more rows.

Each of standards EIA-608, EIA-708 specifies how the caption data should be maintained in a memory (not shown) of closed caption decoder 16. The standards specify under what conditions different portions of the memory need to be erased, and under what conditions the contents of the memory must be preserved. The 708 standard also provides for caption formatted according to EI8-608 if the 608 caption is incorporated into the digital TV signal in a digital form. Hence, the 708 closed caption decoder should be able to decode the 608 closed caption.

It is desirable to reduce the amount of memory needed for a closed caption decoder to decode data transmitted according to different closed caption standards or formats.

SUMMARY

Some embodiments of the present invention reduce the amount of memory needed for a closed caption decoder to process caption data according to different standards. In some embodiments, the memory is shared between two different standards or formats. For example, in some embodiments, the memory is organized according to the 708 standard. In particular, the closed caption decoder allocates a memory buffer for each closed caption window, as specified by the 708 standard. Advantageously, these 708 memory buffers are also used to store the 608 caption data.

In some embodiments, the decoder is capable to display a single buffer of up to four caption rows in a single EIA-708 window of a TV screen. The consecutive rows are displayed contiguously, as specified by the 708 standard. However, the 608 standard allows different rows to be displayed non-contiguously in the 15-row safe caption area, as discussed above in connection with FIG. 2. The decoder is unable to display consecutive rows of a memory buffer non-contiguously. Therefore, for some 608 display styles, the decoder stores different 608 caption rows in different memory buffers. This facilitates the non-contiguous display of 608 caption rows since the decoder is not limited to displaying different buffers contiguously.

The ability to display 608 rows non-contiguously is not always needed. The 608 standard specifies three display styles—pop-on, paint-on, and roll-up. The ability to display rows non-contiguously is needed for the pop-on and paint-on styles, but not for the roll-up style. In the roll-up style, the rows are always displayed contiguously. The text is scrolled up as a new caption line ("row") is received. 47 CFR 15.119(f)(1)(iii) states:

Each time a Carriage Return is received, the text in the top row of the window is erased from memory and from the display or scrolled off the top of the window. The remaining rows of text are each rolled up into the next highest row in the window, leaving the base row blank and ready to accept new text.

Further, 47 CFR 15.119(f)(1)(iii) states: "This roll-up must appear smooth to the user. . ."

The 708 requires a similar capability, that is, a capability to smoothly scroll up a 708 window. Therefore, in the 608 roll-up style, the decoder stores all the rows in the same memory buffer. The result is that at least a portion of the decoder software and/or hardware which implements smooth scrolling up for the 708 rows can be used to implement smooth roll-up for the 608 rows. Using the same software and/or hardware for both tasks reduces the size of the decoder.

According to the 608 standard, when a command is received which necessitates switching from the roll-up style to the pop-on or paint-on style, the text that has been displayed in the roll-up style must remain on the screen and in the decoder memory. However, the pop-on and paint-on styles require non-contiguous display capability. Therefore, in these styles, the decoder stores different caption rows in different buffers as described above. In some embodiments, when a switch is performed from the roll-up style to pop-on or paint-on, the decoder copies all but one rows from the buffer that was used for the roll-up style to different buffers. This copying operation is time consuming.

In some embodiments, the copying is avoided. Different rows are always stored in different buffers in the roll-up style. This is done in addition to storing all the rows in a single buffer. Thus, if the caption has up to four rows, then one buffer stores all the rows, and in addition, up to three other buffers store one row each. The additional buffers are not displayed until switching to the pop-on or paint-on style. If and when the decoder switches to the pop-on or paint-on style, row copying is not needed.

In the roll-up style, the additional buffers are kept up to date when the text is scrolled. Keeping the additional buffers up to date does not require smooth scrolling because the additional buffers are not displayed in the roll-up style.

Other features and advantages of the invention are described below. The invention is defined by the appended claims.

BRIEF DESCRIPTION OF THE DRAWINGS

FIG. 1 illustrates a processing of closed caption data.

FIGS. 2 and 3 depict prior art closed caption on a TV screen.

DETAILED DESCRIPTION

Figure 4:
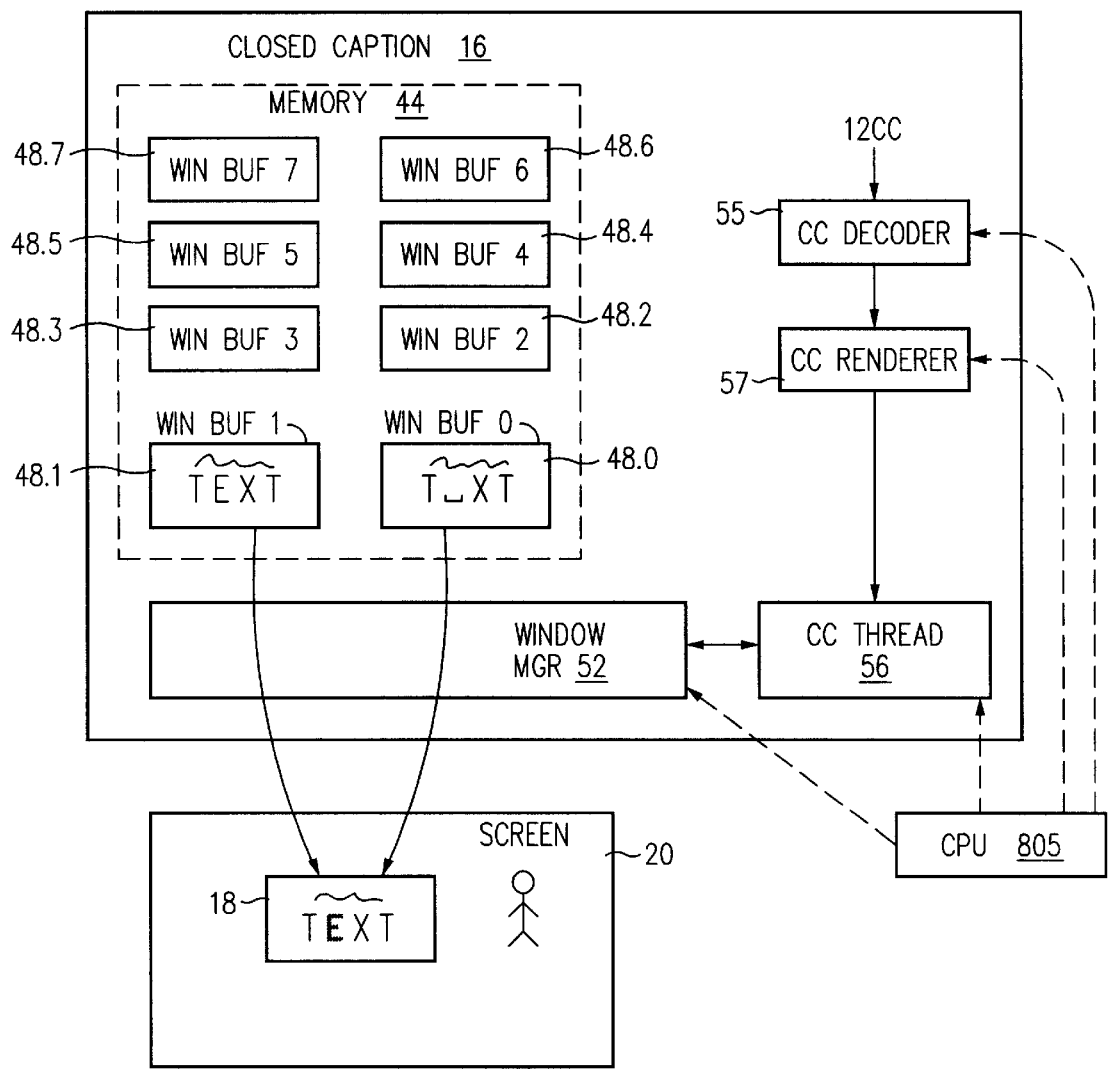
FIG. 4 is a block diagram of a closed caption decoder and a TV screen according to the present invention.

FIG. 4 illustrates organization of memory 44 of closed caption decoder 16 according to the present invention. Memory 44 includes eight "window buffers" 0–7, also shown respectively as buffers 48.0 through 48.7. The buffers conform to the 708 standard. Each buffer 48 includes text to be displayed in a single window 18 on screen 20. The windows are displayed under the control of window manager 52. The window buffers 48 are maintained by a CC thread module 56 implemented as a software thread executed by a computer processor (CPU) 805. In some embodiments, processor 805 is type Trimedia™ TM-1100 available from Philips Semiconductors of Sunnyvale, Calif. Processor 805 is part of a Trimedia™ board available from Philips Semiconductors. In other embodiments, the caption decoder 16 is part of a set-top box of type DTR-HD1 designed by Sony Corporation of Sunnyvale, Calif. However, the invention is not limited to any particular processor or any other particular hardware.

In closed caption decoder 16, CC decoder module 55 decodes closed caption data 12CC. CC renderer 57 stores the decoded data in a FIFO (not shown). CC thread module 56 reads the closed caption data 12CC from the FIFO and updates appropriate window buffers 48 by making calls to window manager 52. For each window buffer 48, when the buffer contents are to be displayed, CC thread 56 provides to window manager 52 a window ID (0–7) of the buffer and the window priority. The priority is as defined by EIA-708. The priority determines which window is to be displayed when different windows overlap.

The window manager incorporates the buffer contents into signal 22 (FIG. 1) to cause the corresponding window 18 to be displayed at a location specified by CC thread 56.

In some embodiments, window manager 52, CC decoder 55, and CC renderer 57 are software programs executed by the same processor 805 as CC thread 56. However, the invention is not limited to software implementations or to the same processor executing the CC thread, the window manager, the CC decoder and the CC renderer.

For the 708 caption, the window buffers 48 are organized in pairs. Each pair corresponds to one window 18. Thus, the pair of buffers 0 and 1 correspond to a single window 18. Buffers 2 and 3 correspond to a single window, buffers 4 and 5 correspond to a single window, and buffers 6 and 7 correspond to a single window. These pairs are used to implement flashing. In FIG. 4, window 18 includes a line "TEXT", and the letter E is flashing. Window 18 displays the contents of buffers 48.1, 48.0. Buffer 48.1 includes all the four characters "TEXT". In buffer 48.0, the letter E is missing (replaced by a space). CC thread 56 instructs the window manager 52 to display the buffers 48.1 and 48.0 at the same location on screen 20 (the location of window 18). CC thread 56 switches the priorities of window buffers 48.1 and 48.0 at successive time intervals measured using timer interrupts. At first, buffer 1 has a higher priority than buffer 0. Therefore, window manager 52 displays the buffer 1 and not the buffer 0. Hence, E gets displayed. Then, the priority of window 0 becomes higher than the priority of window buffer 1. E disappears from screen 20. This continues as long as flashing is in effect.

Figure 5:
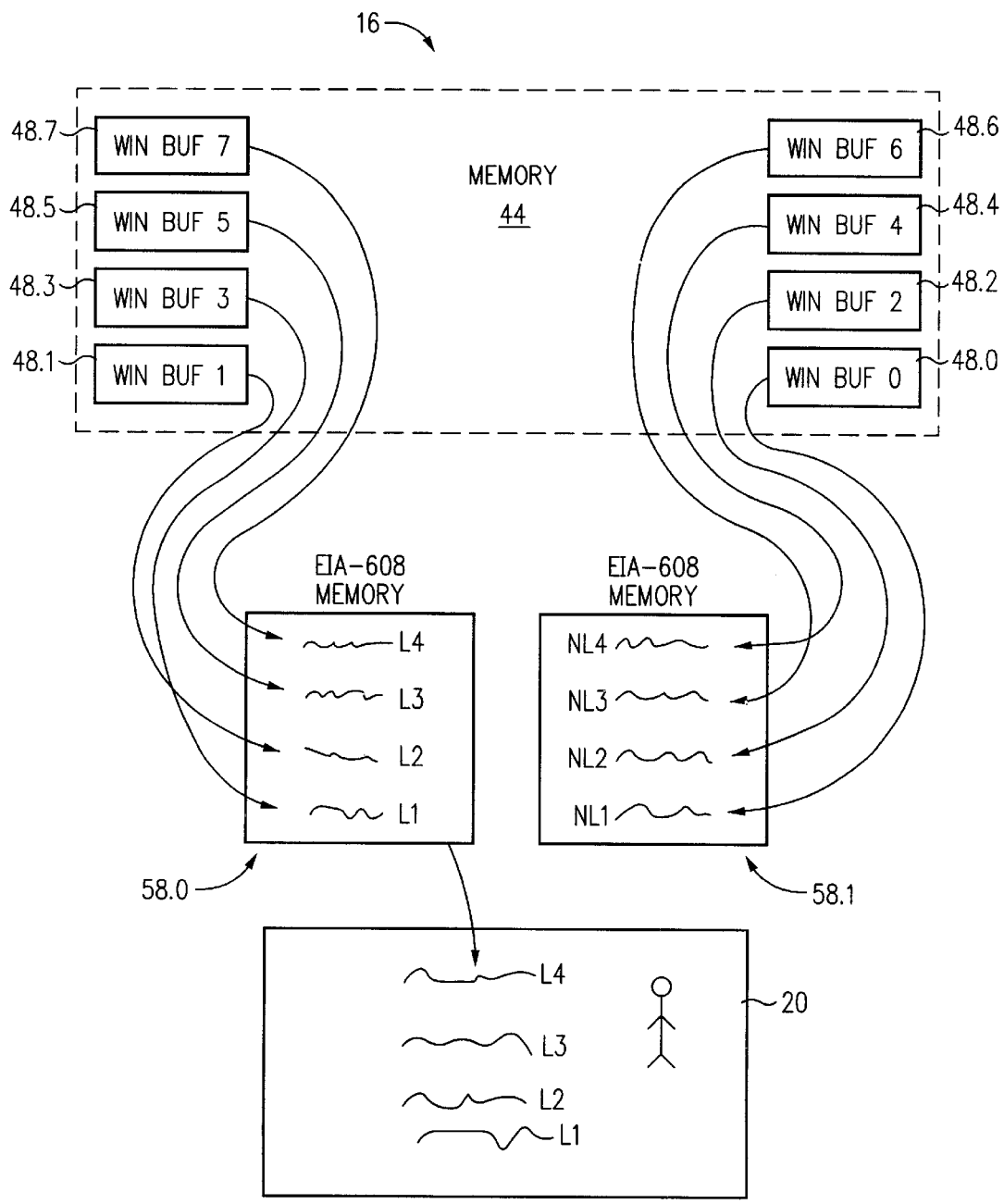
FIGS. 5 and 6 depict data structures in the memory of the closed caption decoder of FIG. 4.
Figure 6:
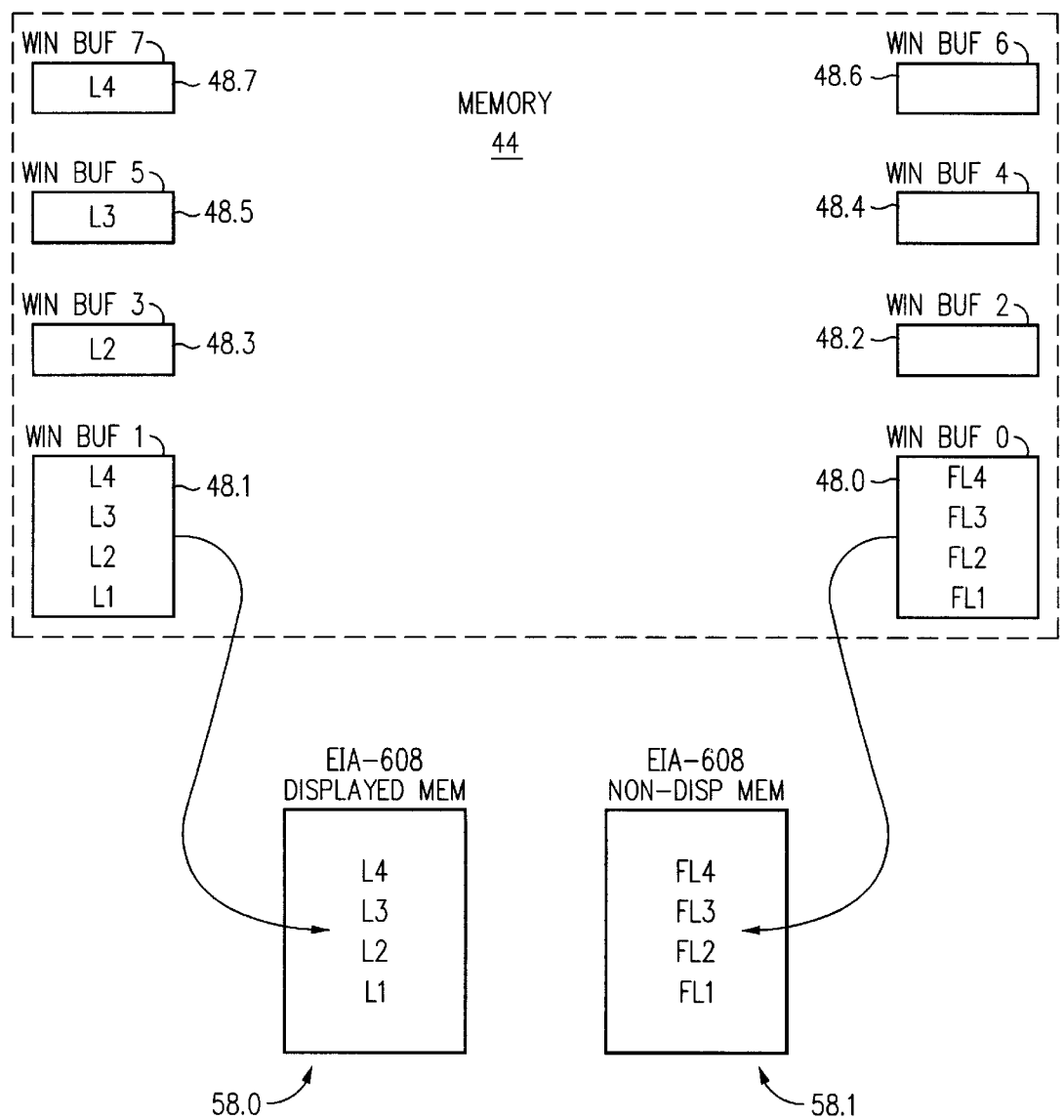

FIGS. 5 and 6 illustrate the use of buffers 48 for displaying EIA-608 caption data. The 608 standard specifies that a closed caption decoder must have a displayed memory and a non-displayed memory. FIG. 5 shows memories 58.0 and 58.1. At any given time, any one of these memories can be the 608 "displayed memory", while the other one of these memories can be the "non-displayed memory." The contents of the displayed memory are displayed on screen 20. The contents of the non-displayed memory are not displayed. A 608 command can flip the memories, causing the memory 58.0 to become non-displayed and the non-displayed memory to become displayed.

Memories 58.0, 58.1 are not actually present in the decoder of FIG. 5. These memories are emulated by window buffers 48. Memory 58.0 is emulated by buffers 48.1, 48.3, 48.5, 48.7. Memory 58.1 is emulated by buffers 48.0, 48.2, 48.4, 48.6. For the 608 caption, some embodiments do not implement flashing for the pop-on and paint-on styles.

FIG. 5 illustrates pop-on and paint-on styles. In the example of FIG. 5, memory 58.0 is displayed and memory 58.1 is non-displayed. Displayed memory 58.0 includes rows L1, L2, L3, L4, listed from the bottom up. These rows are not necessarily contiguous in the 15-row area 58.0. Row L1 is stored in window buffer 48.3. Row L2 is stored in window buffer 48.1. Row L3 is stored in window buffer 48.5. Row L4 is stored window buffer 48.7.

CC thread 56 causes window manager 52 (FIG. 4) to display buffers 48.1, 48.3, 48.5 and 48.7. (If less than four rows are present, the unused buffers are not displayed.) Thus, rows L1–L4 are displayed in screen 20 in FIG. 5. Buffers 48.0, 48.2, 48.4, 48.6 are not displayed.

In FIG. 5, four rows NL1, NL2, NL3, NL4 are shown in memory 58.1. These rows are stored in respective buffers 48.0, 48.2, 48.6, 48.4. If a 608 command (e.g. End of Caption) necessitates the non-displayed memory to become the displayed memory, CC thread 56 causes window manager 52 to display the buffers 48.0, 48.2, 48.4, 48.6 on screen 20. (If the memory 58.1 stores less than four rows, less than four of the buffers 48.0, 48.2, 48.4, 48.6 are displayed.) End of Caption also necessitates the displayed memory to be non-displayed. CC thread 56 causes the buffers 48.1, 48.3, 48.5, and 48.7 to become non-displayed.

FIG. 6 illustrates the 608 roll-up style. In the roll-up style, two, three or four rows can be displayed. These rows can be displayed anywhere in the 15-row safe caption area, but the rows are contiguous. As shown in FIG. 6, all of the rows are stored in window buffer 48.1. The bottom ("base") row L1 is stored in row 4 of buffer 48.1. The next row up (L2) is stored in row 3 of buffer 48.1. The next row up (L3), if present, is stored in row 2 of buffer 48.1. The next row up (L4 ), if present, is stored in row 1 of buffer 48.1.

Window manager 52 always displays the consecutive rows of any window buffer 48 contiguously.

To implement flashing, the caption in buffer 48.1, but with flashing letters omitted, is also placed in window buffer 48.0. This caption is shown as rows FL1–FL4 in FIG. 6. This emulates placing these rows into memory area 58.1. CC thread 56 switches the priority of window buffers 48.1 and 48.0 to produce the flashing effect, as explained above in connection with FIG. 4. The two buffers are displayed in the same area of screen 20. Making the window buffer 48.0 to have higher priority than buffer 48.1 emulates making the memory 58.1 displayed and the memory 58.0 non-displayed.

An advantage of placing each caption row into a separate buffer in the pop-on and paint-on styles (FIG. 5) is that the rows can be displayed non-contiguous on screen 20 even though the window manager displays each single buffer 48 contiguously. An advantage of placing the rows into a single buffer in the roll-up style (FIG. 6) is as follows. When a carriage return arrives in roll-up style, the text in window 18 is supposed to smoothly scroll up. The smooth scrolling-up capability is also required by the 708 standard. Therefore, CC thread 56 includes software code that implements smooth scrolling up in buffers 48.1 and 48.0 for the 708 standard. The same code (with minor modifications implemented using conditional branches) implements the smooth scrolling-up for the 608 standard. (The scroll-up code is described below in connection with FIGS. 10A–10C.) Using the same code makes the CC thread 56 smaller. Also, in some embodiments, smooth scrolling is easier to implement if all the rows being scrolled are stored in a single buffer 48.1 rather than in four different buffers 48.1, 48.3, 48.5, 48.7 as would be required if different rows were in different buffers as in FIG. 5.

However, when the caption is being displayed in the 608 roll-up style and a 608 command arrives that necessitates switching to the pop-on or paint-on style, the caption data being displayed in the roll-up style must remain displayed after switching to the pop-on or paint-on style, and must remain in the 608 displayed memory. In order to reduce the time it takes to switch from the roll-up to the pop-on or paint-on style, CC thread 56 performs as follows. At all times in the roll-up style, row L2 is stored in buffer 48.3. Row L3, if present, is stored in buffer 48.5. Row L4, if present, is stored in buffer 48.7. Buffers 48.3, 48.5, and 48.7 are not displayed in the roll-up style. Buffers . 48.2, 48.4, 48.6 are unused in the roll-up style. These buffers are cleared and reset for use in pop-on or paint-on should the style be switched from roll-up.

When a 608 command necessitates switching to the paint-on or pop-on style, CC thread 56 performs the following actions:

(1) First, CC thread 56 terminates flashing, and marks the memory 58.0 displayed and the memory 58.1 non-displayed. CC thread 56 also instructs window manager 52 to display window buffers 48.3, 48.5 and 48.7. (If the caption has less than four rows, the unused buffers are not displayed by thread 56.)

(2) Then, CC thread 56 changes the size of the displayed area ("active area") of buffer 48.1 to one row to include only the row L1. In some embodiments, changing the size of the displayed area is done by changing a data structure 1720 (FIG. 15), described below, associated with buffer 48.1, and by passing the data structure to window manager 52 to update the screen 20. The total size of buffer 48 remains unchanged.

(3) Clear the buffer 48.0.

Because buffers 48.3, 48.5 and 48.7 become displayed before the displayed-area-of buffer 48.1 is shrunk down to one row, a momentary disappearance of rows L2, L3, L4 from screen 20 is avoided.

Modules of Closed Caption Decoder 16

DEMUX (not shown)

Demultiplexer (DEMUX) module sorts the transport stream into audio and video components and other data and distributes the video components to a video decoder module.

Video Renderer (not shown)

The video renderer module decodes the video component by use of a video decoding device such as SGS-Thomson Sti7000, a high definition MPEG-2 video decoder. The video decoding device can be coupled to a memory. The video renderer generates decoded video and embedded CC data. The video renderer provides the CC data to a CC decoder module.

CC Decoder 55

The CC decoder module translates the CC data into CC commands and caption. The translation method is specified in the EIA-608 and EIA-708 standards. The CC decoder module provides the CC commands and caption to CC renderer 57.

CC Renderer 57

The CC renderer module 57 stores the CC commands and caption in memory 44. The CC renderer provides a ready signal to the CC thread 56 to communicate a command is available.

CC Thread 56

Figure 7:
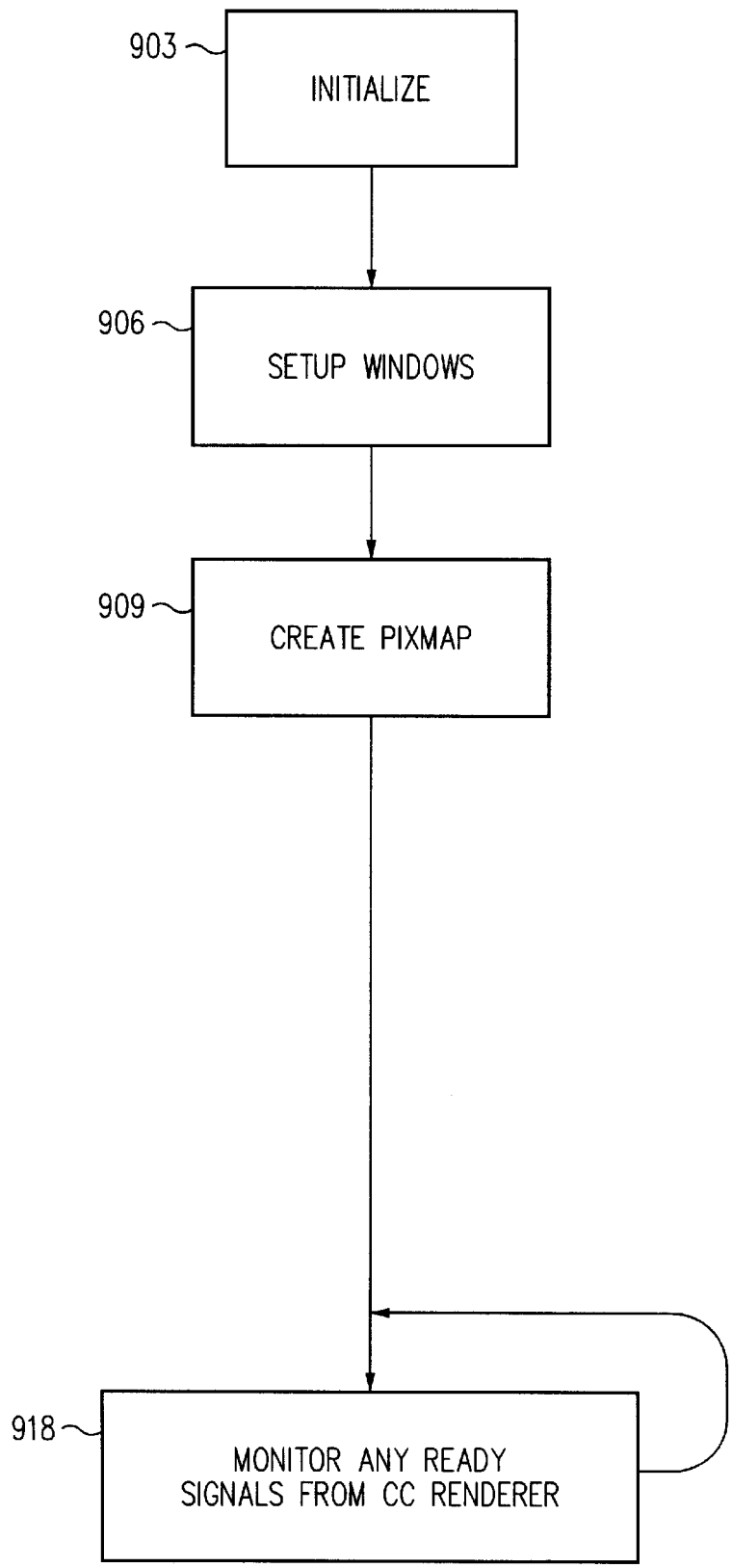
FIG. 7 depicts a flow diagram of the main routine of a closed caption display program CC thread, in accordance with an embodiment of the present invention.

FIG. 7 depicts a flow diagram of the main routine of program CC thread. At step 903, the main routine performs initialization. In some embodiments, only the minimum requirements specified in EIA-708 are implemented. Step 903 establishes the size of total video display area on screen 20, as specified by input video, i.e. either high definition (HDTV) or standard definition.

At step 906, the main routine allocates memory buffers 48. Each buffer 48 is a pixel map for a corresponding window 18. In some embodiments, each buffer 48 is large enough to store 5 rows of caption. The fifth row is used for smooth scrolling. The actual displayed portion of a window buffer (an "active region" or "active area") can be 0 to 4 rows.

At step 909, the main routine allocates a pixmap area in memory 44 for a window of dimensions "winsize.width"

and "winsize.height". The pixmap is used for scrolling as described below with reference to FIGS. 10A–10C.

At step 918 (an infinite loop), the main routine reads and processes caption commands and data, as well as listens for a graphics synchronization signal to implement flashing and smooth scrolling.

Window Manager

To display a window buffer 48.i, the window manager must know: 1) a window ID (stored in data structure 1720 of FIG. 15), 2) the active region, 3) a screen location to display the active region, and 4) a priority of the window. The window manager displays a window having a highest priority over lower priority windows if windows overlap.

Figure 8:
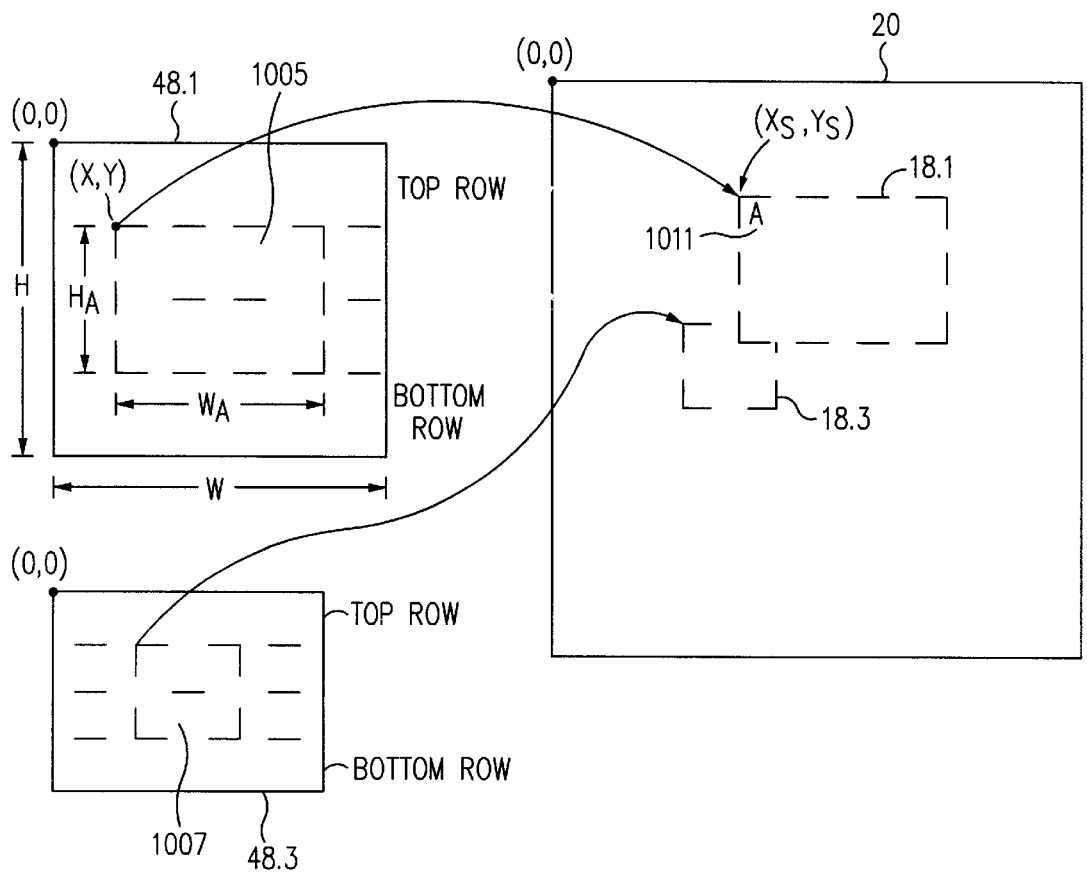
FIG. 8 depicts the data structures used by a closed caption decoder of one embodiment of the present invention and corresponding images on a screen.

FIG. 8 depicts window buffers 48.1 and 48.3 having respective active regions 1005 and 1007. In the commands described subsequently, variables "winsize.width" and "winsize.height" specify the respective maximum width, W, and height, H, in pixels, of a window corresponding to window buffer 48.1. Variables "windisp.height" and "windisp.width" specify the respective width, $W_A$, and height, $H_A$, in pixels, of the active region of window buffer 48.1. Variables "windisp.x" and "windisp.y" specify, in pixels, the respective coordinates (x,y) of the upper left hand corner of the active region within window buffer 48.1. The active region is shown displayed as window 18.1 in screen 20. Variables "winpos.x" and "winpos.y" specify, in pixels, the coordinates $(X_s, Y_s)$ of the upper left hand corner of the active region within screen 20. In the example window buffer 48.1 has a higher priority than window buffer 48.3. Hence window 18.1 corresponding to buffer 48.1 is displayed over window 18.3 corresponding to buffer 48.3. Variables "penpos.x" and "penpos.y" provide the coordinates, in pixels, at which a caption character 1011 is written into window 18.1. Variable "icolumn" represents the column position of the caption character 1011 on the row being written (also called the "current" or "active" row or line).

Overview of Variables

The following table represents some of the relevant variables.

| Variable | Brief Description |
| --- | --- |
| memory | Specifies whether caption will be written to the 608 memory 58.0 or 58.1 |
| Ccrow | Row in the 608 displayed memory corresponding to window buffer 48.j, where j =0 to 7. |
| baserow | Row in the 608 displayed memory corresponding to the bottom row of window buffer 48.j, where j =0 to 7. |
| nrow | Number of rows of caption to be displayed. |
| winidfree[j] | Whether window buffer 48.j, where j =0 to 7, is used for a window buffer or is free to be associated with a window. |
| display | Whether window [j] (i.e. window corresponding to window buffer 48.j), where j =0 to 7, is to be displayed. |
| set.visible | Whether window [j], where j =0 to 7, is to be visible. |
| winsize.width, winsize.height | Size of window buffer |

-continued

| Variable | Brief Description |
| --- | --- |
| Winrows | Number of displayed rows in a window. |
| Wincolumns | Number of columns in a window. |
| Windisp.x, windisp.y | Coordinates of upper left hand corner of window within the 608 displayed memory |
| windisp.height, windisp.width | Dimensions of active region within a window buffer |
| priority | Priority of window |
| displayedmemory | Either 0 or 1, indicates whether the 608 memory 58.0 or 58.1 is displayed; windows 1, 3, 5, and 7 (i.e. windows associated with buffers 48.1, 48.3, 48.5, 48.7) correspond to memory 58.0; windows 0, 2, 4, and 6 correspond to memory 58.1 |
| winpos.x, winpos.y | Specifies the coordinates $(x_s, y_s)$ of the upper left hand corner of the active region within the 608 memory 58.0 or 58.1 |
| pacdata.row, pacdata.indent | Respective row and column number of caption position within the 608 displayed memory |
| penpos.x, penpos.y | Specify coordinates of caption within a 608 display region. |
| icolumn | Specifies the column position of caption. |
| currwin | Specifies the current window buffer 48. The incoming commands and caption are applied to this buffer unless a different buffer is specified (which then becomes the "current" buffer). |

Roll-up Captioning Command

After the CC Thread main routine receives a 608 command that specifies that subsequently displayed caption will be in roll-up style, the CC thread executes the roll-up captioning command (hereafter "RCC") to initialize windows for roll-up style.

Figure 9A:
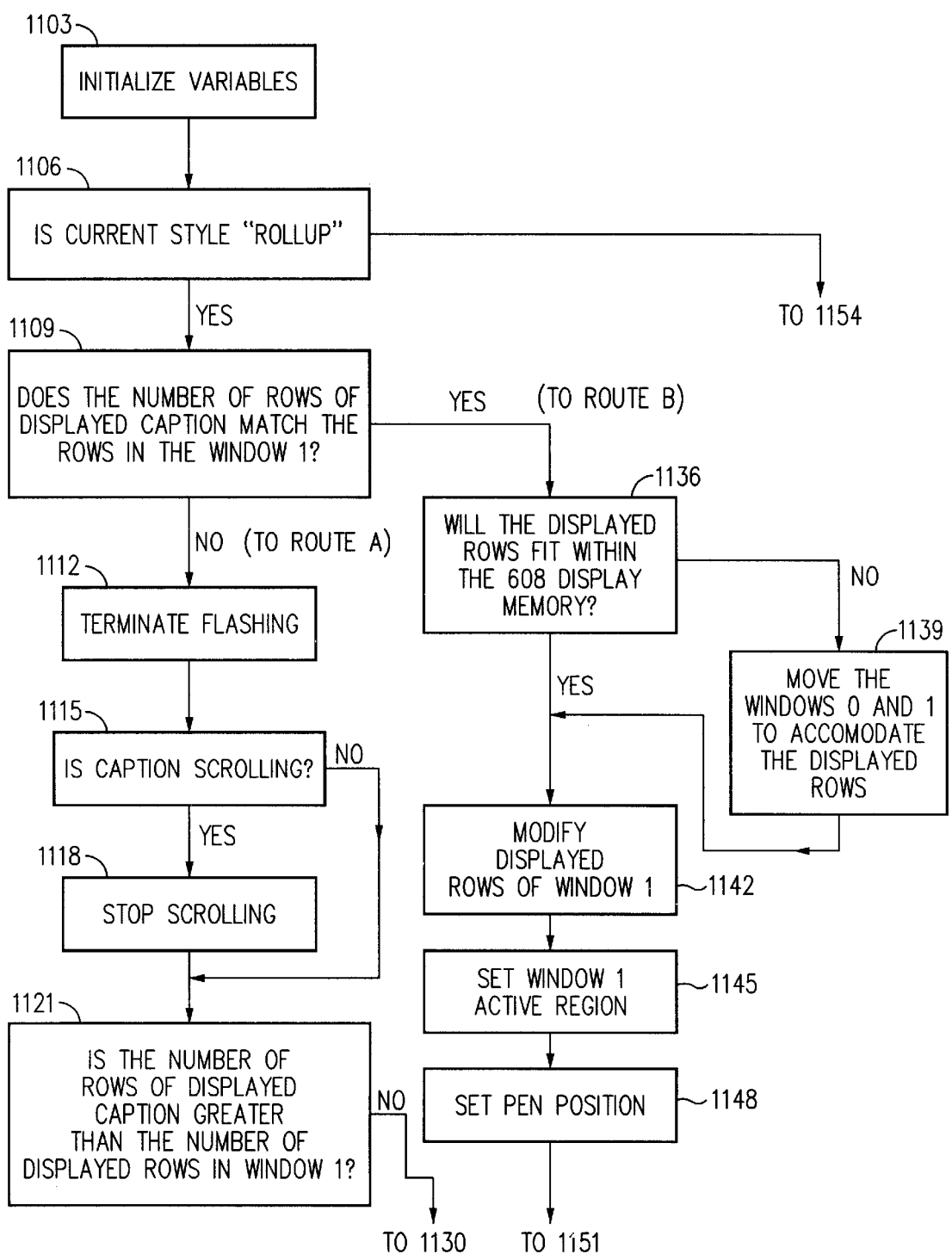
FIGS. 9A–9F are a flow diagram of a portion of a closed caption decoder according to one embodiment of the present invention.
Figure 9B:
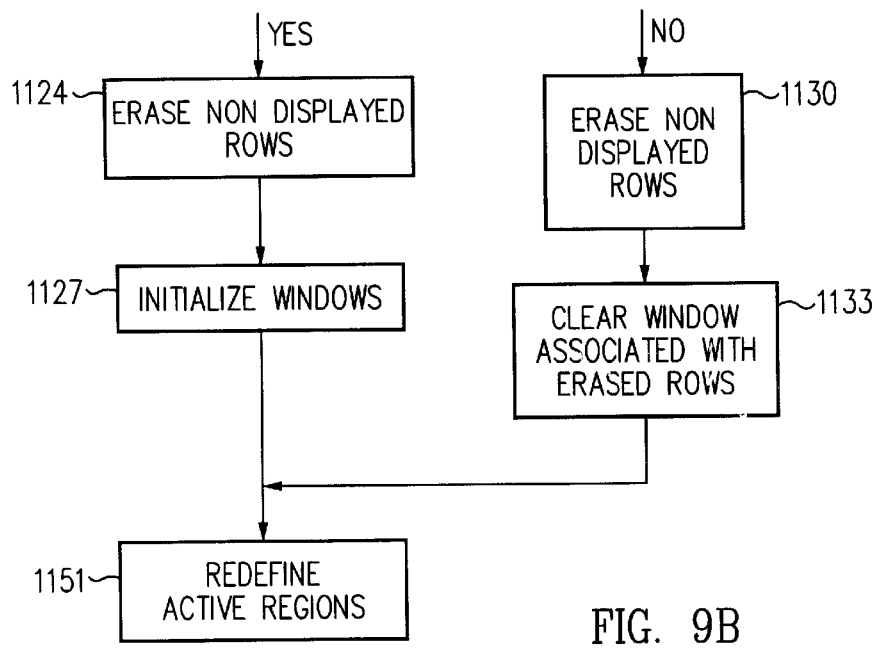
Figure 9C:
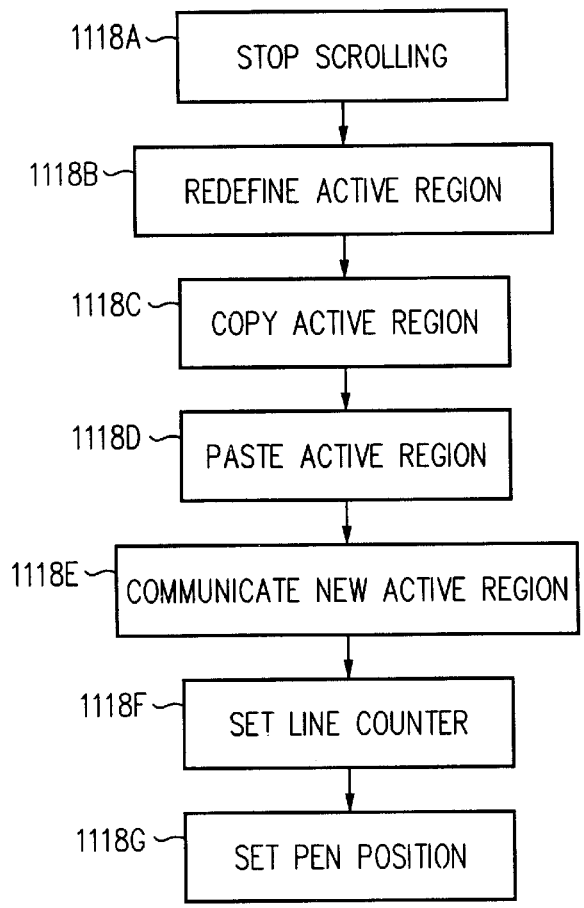

FIGS. 9A–9D depict the RCC. Referring to FIG. 9A, at step 1103, the RCC performs initialization to set the number of rows of subsequently displayed caption, specified by variable "nrow". The initialization includes sequentially: 1) loading the parameter "data" which specifies the number of rows of caption displayed subsequently; 2) equating variable "nrow" to "data"; and then 3) flooring or capping the variable "nrow" where it is respectively less than or greater than an acceptable range of "nrow", i.e., 2 and 4. Parameter "data" is loaded from an incoming CC data stream, discussed earlier.

At step 1106, the RCC determines whether the previous caption style was "roll-up". If so then steps 1109 to 1127 follow, otherwise steps 1154 to 1181 follow. At step 1109, the RCC determines whether the number of rows in subsequently displayed caption, "nrow", equals the number of displayed rows of window buffer 48.1, specified by variable "winrows". If not, then the subsequent steps include 1112 to 1127 (route A); if so then the subsequent steps include 1136 to 1148 (route B).

Figure 10A:
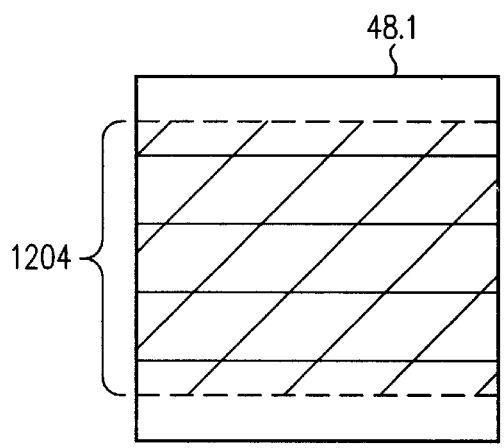
FIGS. 10A–10C illustrate a memory buffer in a closed caption decoder during window scrolling according to one embodiment of the present invention.
Figure 10B:
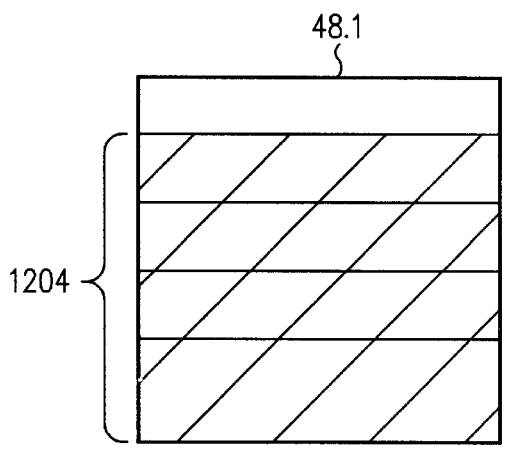
Figure 10C:
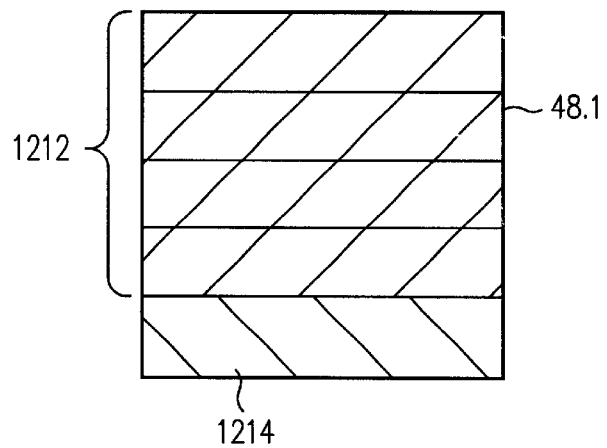

Beginning route A, at step 1112, the RCC terminates flashing of displayed caption. At step 1115, the RCC determines whether the displayed caption is scrolling. If so, then at 1118, the RCC terminates scrolling of caption by substeps 1118A to 1118G of FIG. FIG. 9C. FIGS. 10A–10C illustrate window buffer 48.1 during the course of terminating scrolling in accordance with the substeps 1118A to 1118G. This is called "preemption" of scrolling. In substep 1118A, the RCC terminates scrolling by setting the scrolling variable "scrollstate" to zero. This indicates that no scrolling should be performed on future timer interrupts. In substep 1118B, the RCC moves the active region to cover the bottom 4 rows of window buffer 48.1. FIG. 10A illustrates the position of the active region 1204 before substep 1118B. FIG. 10B illustrates the position of the active region 1204 following completion of substep 1118B. In substep 1118C, the RCC copies the active region of window buffer 48.1 into the pixmap (hereafter "copied portion"). In substep 1118D, the RCC pastes the copied portion (hereafter "pasted portion") to occupy the top four rows of window buffer 48.1. In FIG. 10C, region 1212 illustrates the pasted portion in buffer 48.1. In substep 1118D, the RCC fills the bottom row of window buffer 48.1 with a blank region (region 1214 in FIG. 10C). In substep 1118E, the RCC communicates to the window manager that a displayed portion of the displayed window, i.e., "active region", is the pasted portion 1212. Substeps 1118A to 1118E are repeated for both window buffers 48.0 and 48.1. The step 1118 further includes: substep 1118F, decrementing "linecounter" to specify the active row is the bottom row of the displayed window; and substep 1118G, moving the pen position to the bottom row of the displayed window.

If the active area of buffer 48.1 is less than four rows, only the active area rows undergo the scrolling procedure of FIGS. 10A–10C.

Of note, when a buffer 48 stores 708 data, the top row of buffer 48 stores the top row of the window 18 corresponding to the buffer; the second row of the buffer stores the second row of the window 18; and so on. Thus, the top left corner of the buffer is the top left corner of the active area. (This rule is violated during smooth scrolling, described below.) For the 608 data, the base caption row is stored in the fourth row of buffer 48, and the remaining caption rows are stored above the fourth row.

Of note, the 708 standard specifies that a window can be written starting at the top row. Under the 608 standard, when the roll-up style is initialized, the window is written starting at the base row.

The RCC effectively scrolls the window by as many pixels as needed to finish an earlier-started scrolling operation. Regular (non-RCC) smooth scrolling is performed similarly, but the regular scrolling scrolls the caption up by one pixel only (or by some other number of pixels) at regular intervals (measured using timer interrupts) to produce a smooth scrolling effect.

Returning to RCC, if the currently displayed caption is not scrolling, then step 1121 follows. Step 1121 determines whether the number of rows of subsequently displayed caption, "nrow", is greater than the number of displayed rows in window buffer 48.1, specified by variable "winrows". If so, then steps 1124 and 1127 follow (hereafter "route C"), otherwise, steps 1130 and 1133 (hereafter "route D") follow.

Beginning route C, at step 1124 (FIG. 9B), the RCC erases rows in the 608 displayed and non-displayed regions 58.0, 58.1 corresponding to respective window buffers 48.0 and 48.1, by covering the non-displayed rows with a blank rectangle.

Figure 9D:
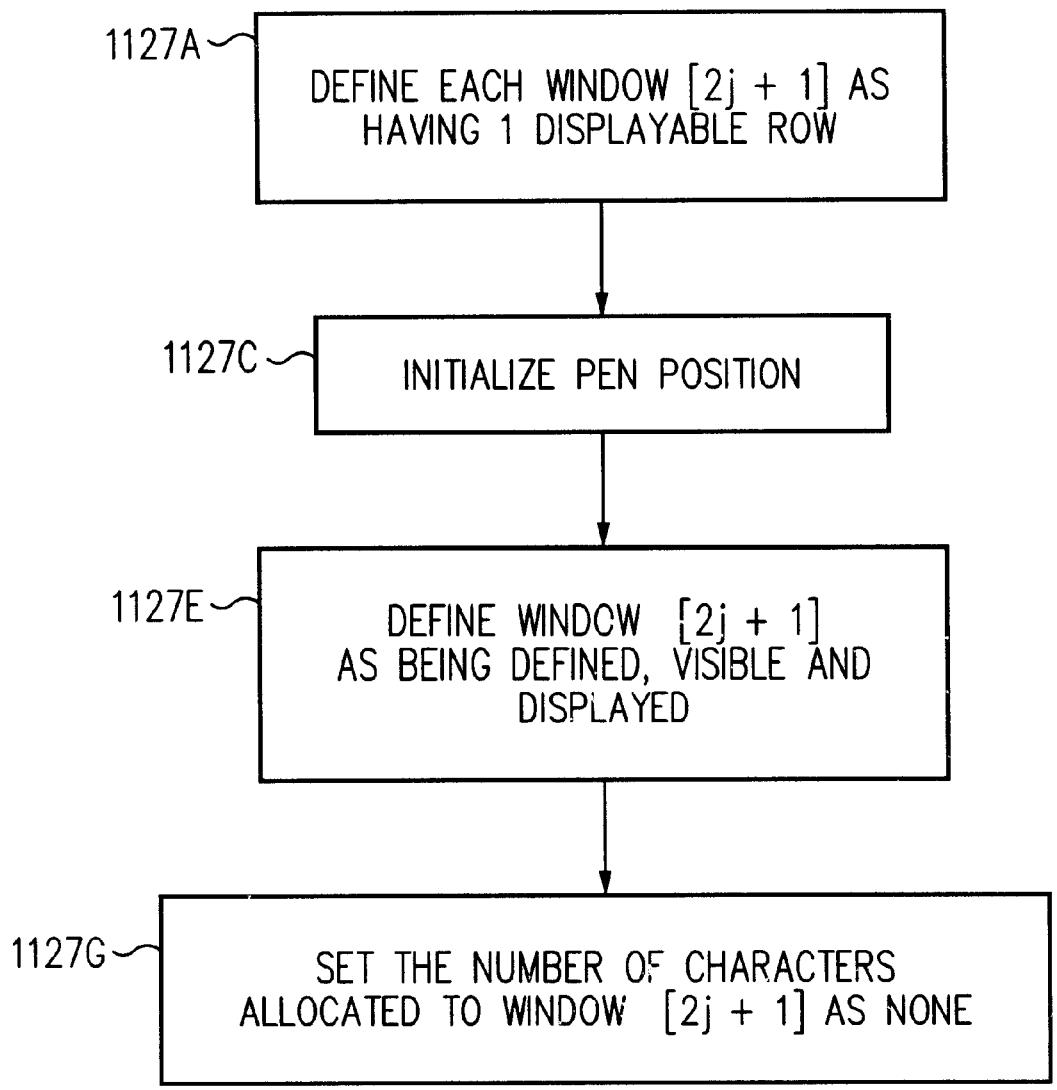

At step 1127, for j="winrows" to "nrow" −1, RCC defines windows numbered [2j+1]. FIG. 9D depicts substeps of step 1127. At substep 1127A, the RCC defines each window [2j+1] as having displayable 1 row by setting "winrows" =1. At substep 1127C, the RCC initializes a pen position for each window [2j+1] at the left most position of the displayable row of window [2j+1]. At substep 1127E, the RCC defines each newly allocated window [2j+1] as being defined (by setting "define" to 1), but not visible and displayed (by setting each of variables "visible" and "display" to 0). At substep 1127G, the RCC sets the number of caption characters allocated to each defined window [2j+1], specified by variable "columnwidth," to zero thereby signifying no caption is associated with each window [2j+1].

In step 1127, the RCC defines at least one additional window to account for a change in caption style to paint-on or pop-on. Please see the discussion of a change in style from roll-up to paint-on or pop-on with respect to commands Resume Caption Loading and a Resume Direct Captioning.

Beginning route D, where the number of rows of subsequently displayed caption, "nrow", is less than the number of displayed rows of window buffer 48.1, "winrows", at step 1130 (FIG. 9B), the RCC erases rows in window buffer 48.1 that are not to be displayed ("erased rows"), i.e., row numbers which exceed "nrow", by drawing a blank region in window buffer 48.1 in the area corresponding to the erased rows. The RCC erases the same rows in complementary hidden window buffer 48.0.

At step 1133, the RCC clears at least one window buffer, being among window buffers 48.3, 48.5, and 48.7, corresponding to the erased rows of window buffer 48.1 ("cleared window"). Each cleared window was defined in case the caption style switches from roll-up to pop-on or paint-on. The following table represents the associations between window buffer numbers 3, 5, and 7 and rows in window 1.

| window buffer number | associated row in window 1 |
|---|---|
| 3 | baserow-1 |
| 5 | baserow-2 |
| 7 | baserow-3 |

Step 1133 includes: 1) defining each cleared window as transparent on the screen, 2) defining all characters associated with the cleared window as invalid, and 3) specifying the "defined" parameter associated with each cleared window as FALSE.

Next, beginning route B, where the number of rows of subsequently displayed caption, "nrow", equals the number of displayed rows of window 1, "winrows", at step 1136, the RCC determines whether the displayed rows will fit within the 608 displayed memory, either 58.0 or 58.1, by determining whether the row numbers of the bottom rows of windows 0 and 1, respectively "baserow[0]" and "baserow [1]", are less than "nrow." If the displayed rows will not fit within the 608 displayed memory, then at step 1139, the RCC modifies the "baserow[0]" and "baserow[1]" to equal the "nrow", ensuring the top displayed rows of windows 0 and 1 are at the top of the 608 displayed memory.

Otherwise, if the displayed rows will fit within the 608 display memory, then at step 1142, the RCC specifies the number of displayed rows of window 1, "winrows", to equal a number of displayed rows specified by "nrow". At 1145, the RCC defines the active region of window buffer 1 to equal the new dimensions of window 1. At step 1148, the RCC specifies the initial pen position of window buffer 1 to be one the bottom row and the left most column of the window 1.

At step 1151, the RCC communicates to the window manager the active region of windows 0 and 1 to be as specified in step 1118 or 1145.

Figure 9E:
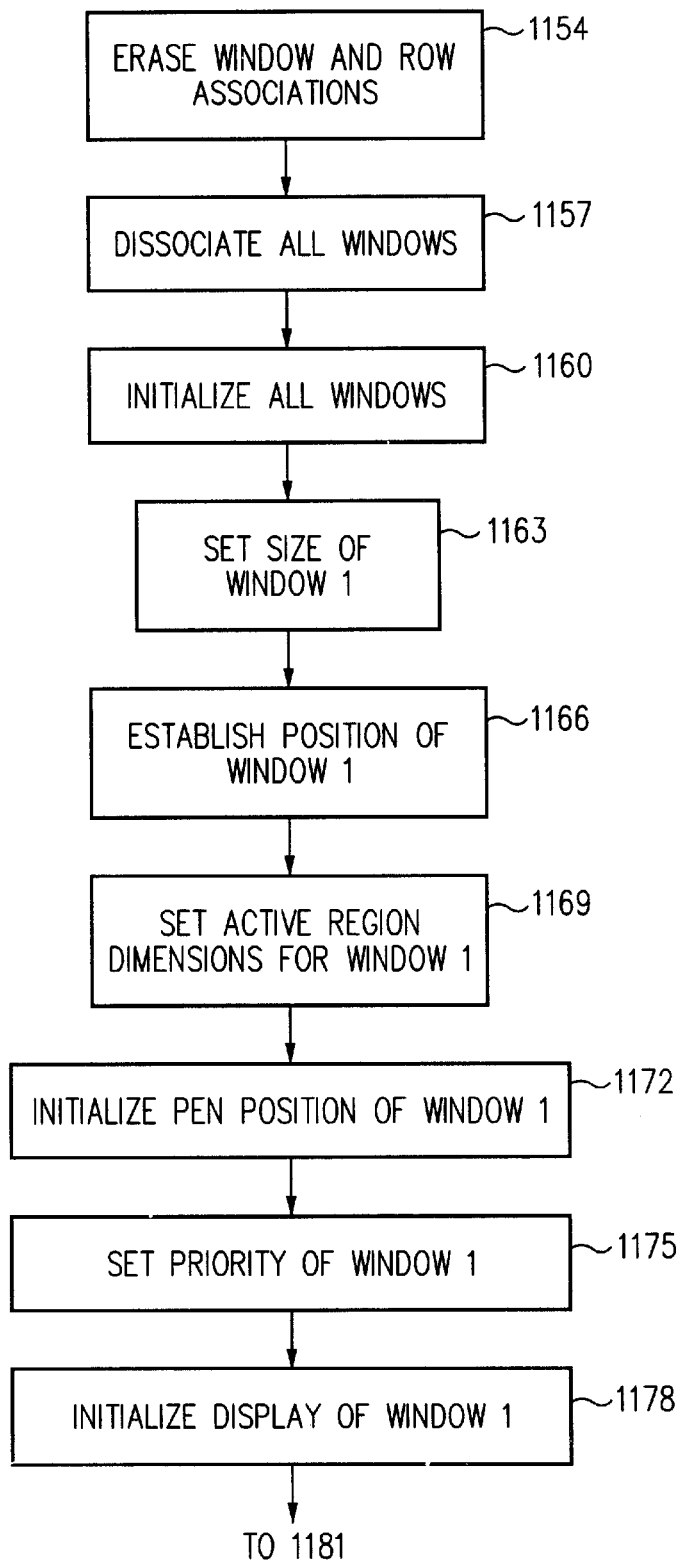

If the previous caption style was not "ROLL-UP", then at step 1154 (FIG. 9E), the RCC blanks the window-row associations stored in variable "ccrow" for windows 0 and 1. At step 1157, for each window, i.e., 0 to 7, the RCC: 1) resets the "baserow" to zero; 2) for any window marked as "defined", resets the "windisp.width" and "windisp.height" to (0,0); and 3) resets an associated "windfree" to 1, thereby indicating a window buffer is free for subsequent allocation.

At step 1160, the RCC initializes the following window parameters: a) window opacity, b) window color, c) text color, d) text font, e) font size, and f) window priority (variable "priority"). Items a, b, c, d, and e are defined in the EIA-608 standard and specified in an input CC bitstream. In this embodiment, a difference in priorities between window 0 and window buffer 1 is at least 2. For successive windows 2 to 7, a difference in associated window priorities is 3; i.e., for j=2 to 7, priority [j]−priority[j−1]=3.

At step 1163, the RCC establishes the displayed (i.e., active) region of window buffer 1 by: 1) equating "winrows" of window buffer 1 to "nrow"; 2) specifying a column number of window buffer 1 as the maximum number of columns in a window; and 3) specifying the height and width of the displayed part of window buffer 1 in terms of pixels ("winsize.height" and "winsize.width"). At 1166, the RCC establishes the position of the active region of window buffer 1 on the 608 displayed memory, i.e., 58.0 or 58.1, by, e.g., 1) setting the "baserow" of window buffer 1 to the bottom row of the 608 displayed memory; and 2) setting the top left hand corner of window buffer 1 on the 608 displayed memory (winpos.x, winpos.y) to be "nrow" from the bottom row of the 608 displayed memory. At step 1169, the RCC establishes the active region of window buffer 1 to equal the size of window buffer 1 defined in 1163. At 1172, the RCC initializes the pen position associated with window buffer 1 to be on the bottom row of window buffer 1. At 1172, the RCC further sets the number of caption characters presently allocated to window buffer 1, "columnwidth", to zero.

At 1175, the RCC establishes the variable "lowpriority" of window buffer 1 to equal the priority of window buffer 0. In flashing mode, the priority of window buffer 1 will be set to "lowpriority", and the priority of window buffer 0 will be set to the priority of window 1.

At 1178, the RCC initializes the complementary windows 0 and 1 to be: 1) visible in the respective 608 displayed memory and 608 nondisplayed memory; 2) displayable in the respective 608 displayed memory and 608 nondisplayed memory; and 3) defined.

Figure 9F:

At 1181 (FIG. 9F), RCC performs a step similar to step 1127 to define at least one window [2j+1] for j=1 to "nrow−1"−1.

Resume Direct Cautioning Command

After the CC Thread main routine receives a command that specifies that subsequently displayed caption will be in paint-on format, CPU executes the resume direct captioning command (hereafter "RDC") to initialize windows for use in a subsequent display of caption in paint-on format.

Figure 11A:
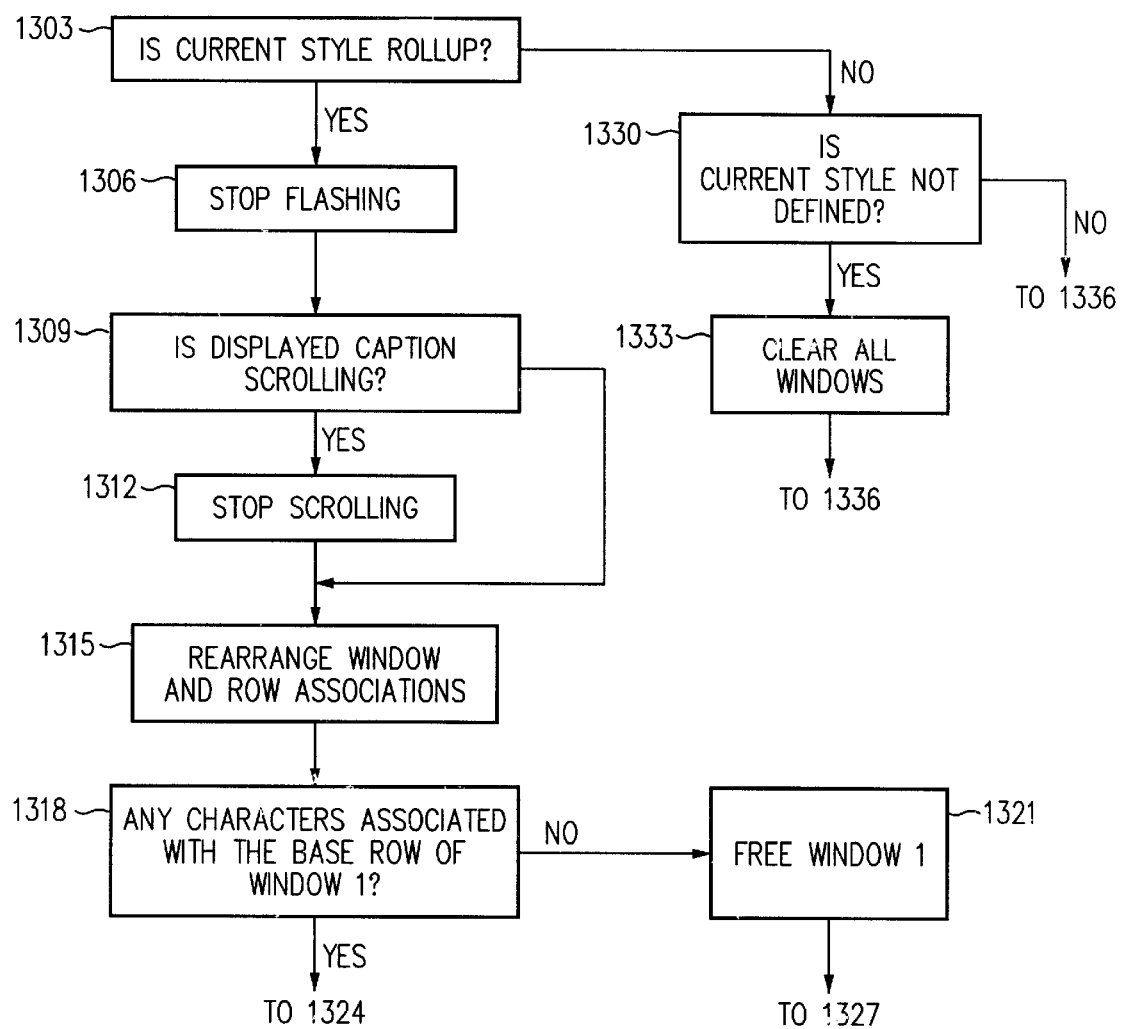
FIGS. 11A–11D are a flow diagram of a portion of a closed caption decoder according to one embodiment of the present invention.
Figure 11B:
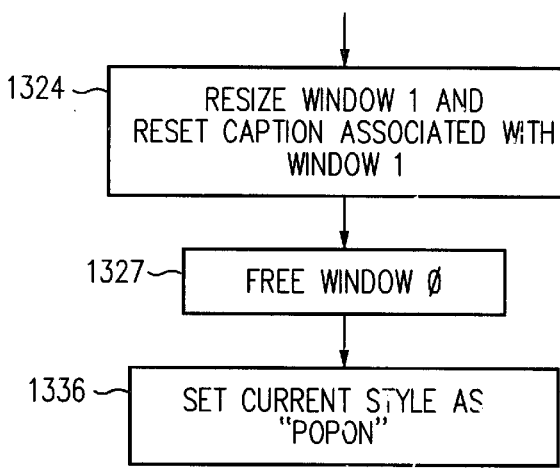
Figure 11C:
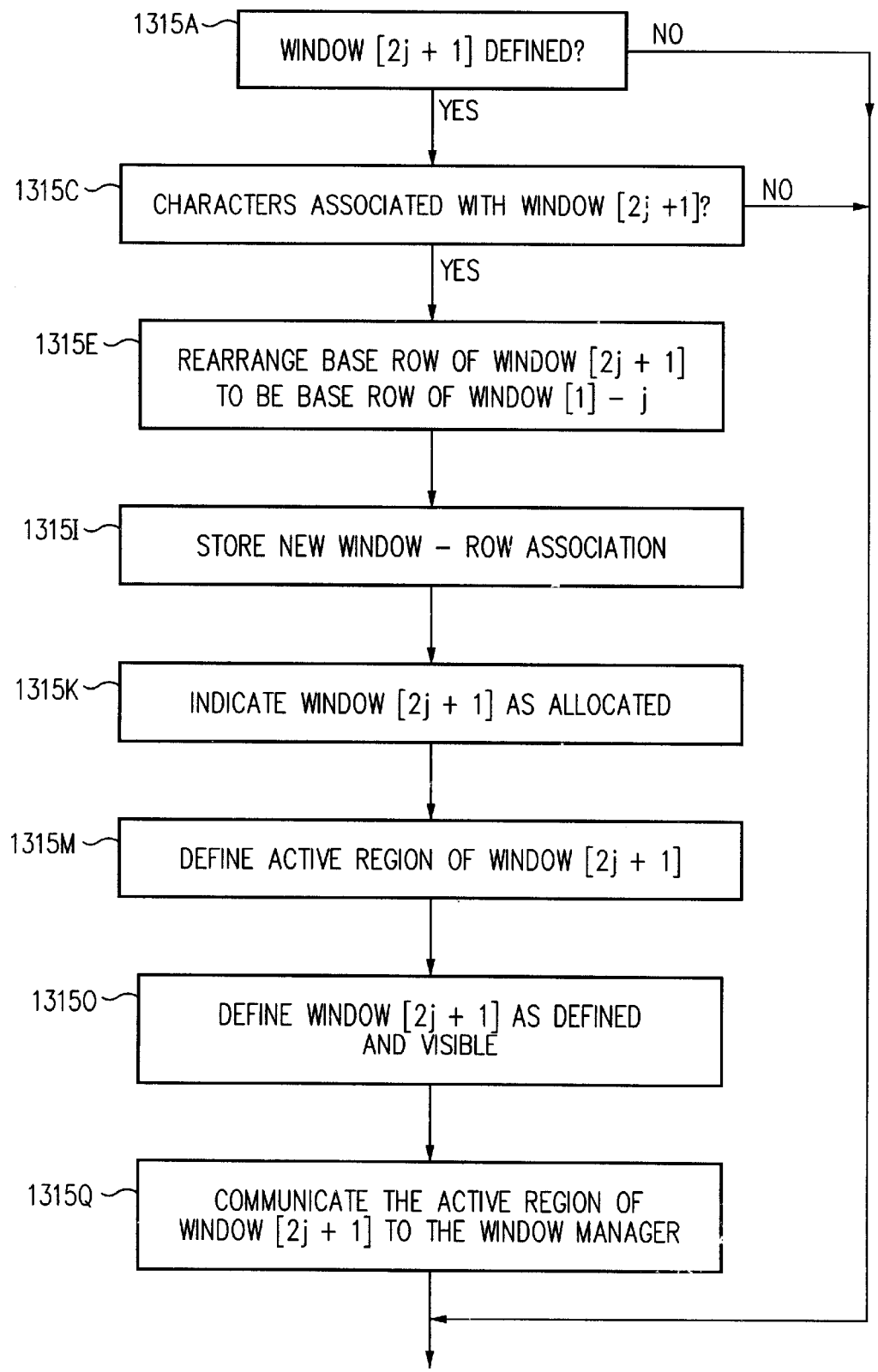

FIGS. 11A–11C depict the RDC. At 1303 (FIG. 11A), the RDC determines whether the current style is "ROLL_UP." If so, then step 1306 follows, otherwise step 1330 follows.

At step 1306, the RDC stops flashing of any displayed caption. At step 1309, the RDC determines whether the displayed caption is scrolling. If so, the RDC next performs step 1312, otherwise the next step is 1315. At step 1312, the RDC disables scrolling by a similar method as described for step 1318 with respect to RCC.

At step 1315, the RDC redefines the association between any "defined" window 3, 5, and 7 and rows in the 608 displayed memory. FIG. 11C depicts substeps of step 1315. The RDC performs substeps 1315A to 1315Q, for j=1 to "nrow−1", where "nrow" is the number of subsequently displayed rows of caption. At substep 1315A, the RDC determines whether window buffer [2j+1] is defined. If not then the next step is 1318. If so then at substep 1315C, RDC determines whether window buffer [2j+1] has any characters in it. The RDC only allocates windows to rows having associated characters. If not then the next step is 1318. If so, then at substep 1315E, the RDC sets "baserow" of window buffer [2j+1] to equal "baserow" of window buffer 1−j. The following tables represent the reassignment of windows to rows of window buffer 1 in substep 1315E.

| window buffer number | nrow=4<br>associated row of window buffer 1 |
|---|---|
| 3 | baserow-1 |
| 5 | baserow-2 |
| 7 | baserow-3 |

| window buffer number | nrow=3<br>associated row of window buffer 1 |
|---|---|
| 3 | baserow-1 |
| 5 | baserow-2 |

| window buffer number | nrow=2<br>associated row of window buffer 1 |
|---|---|
| 3 | baserow-1 |

Figure 12:
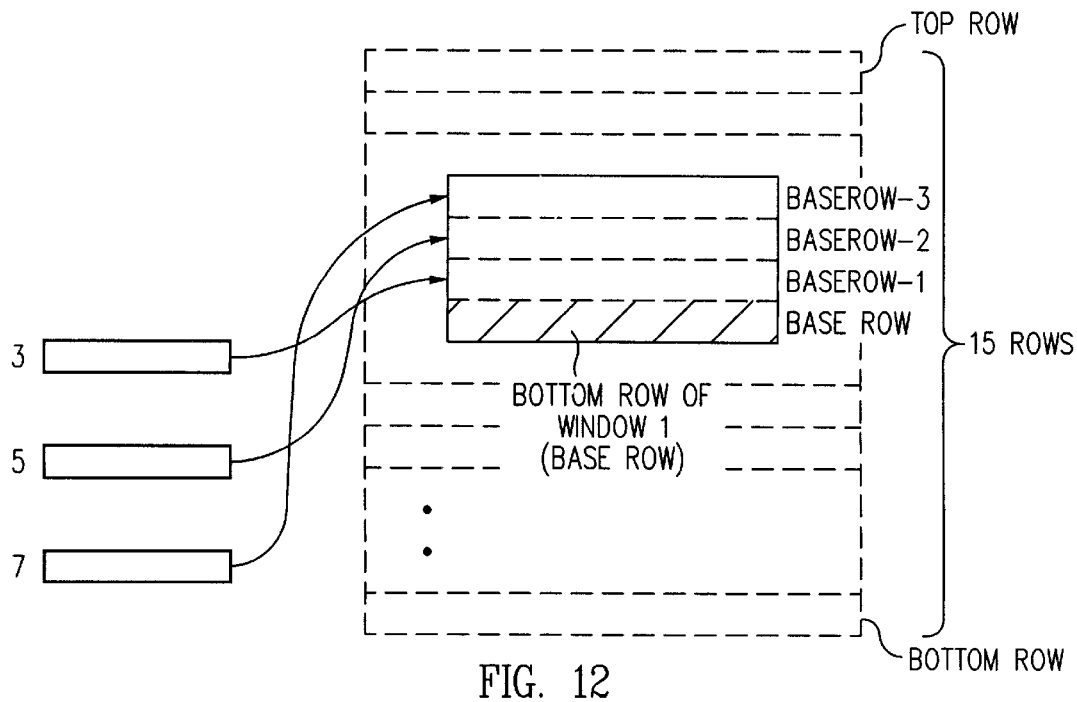
FIG. 12 illustrates data structures in a memory of a closed caption decoder according to one embodiment of the present invention.

FIG. 12 depicts an example of associations of windows 3, 5, and 7 where window 1 includes 4 displayed rows.

Each row of window buffer 1 is positioned within a row of the 608 displayed memory. At substep 1315I, the RDC defines the top left hand corner of the 1 displayed row of window buffer [2j+1] to position the 1 displayed row at a row in the 608 displayed memory that corresponds to the associated row of window buffer 1 specified in substep 1315E. The RDC further assigns the 1 displayed row of window buffer [2j+1] to a row number in the 608 displayed memory, i.e., either 58.0 or 58.1, corresponding to the associated row of window buffer 1. The RDC then stores the window-row association in the variable "Ccrow".

At substep 1315K, the RDC indicates window buffer [2j+1] is allocated by defining winidfree[2j+1] as being 0.

At substep 1315M, the RDC then sets the active region of the window buffer [2j+1] to be 1 row and have a maximum number of columns permitted of a window.

At substep 1315O, the RDC then defines the window buffer [2j+1] as both defined and visible by respectively setting "display" and "visible" both to 0.

At substep 1315Q, the RDC then communicates the active region of window buffer [2j+1] to the window manager.

Figure 11D:
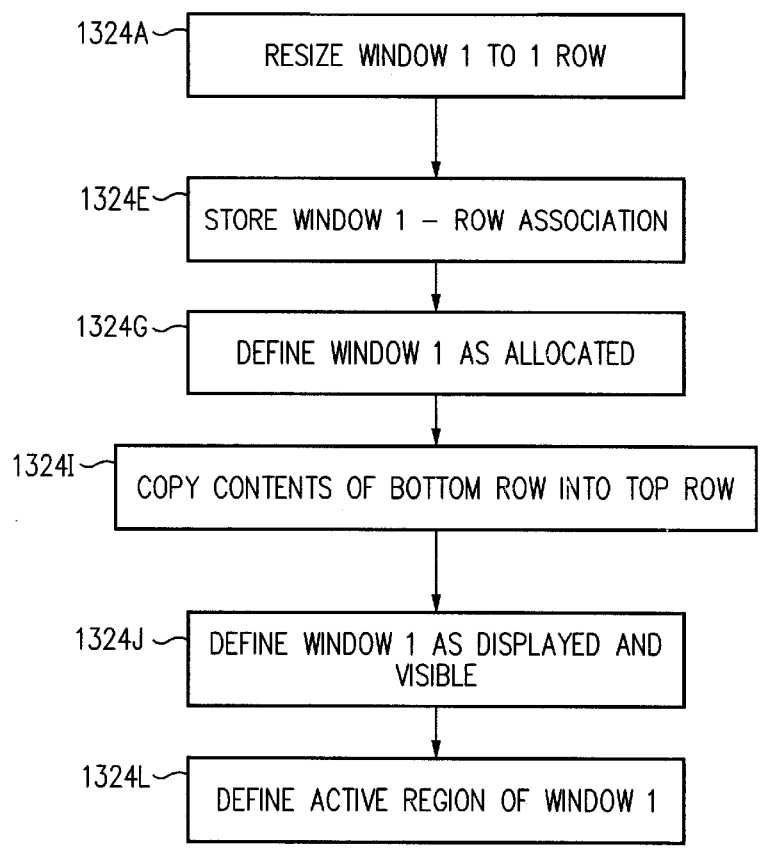

Next, at 1318, the RDC determines whether "baserow" of window buffer 1 has any characters associated. If so, then the next step is 1324, otherwise the next step is 1321. At step 1324 (FIG. 11B), where window buffer 1 has at least one associated character in its bottom row, the RDC resizes the window buffer 1 to 1 displayed row and resets the caption displayed within window buffer 1. FIG. 11D depicts a process including substeps 1324A to 1324L of step 1324 of FIG. 11B.

At substep 1324A, the RDC resizes the displayed region of window buffer 1 to 1 row. At substep 1324E, the RDC stores the association between a row in the 608 displayed memory and "baserow" of window buffer 1. At substep 1324G, the RDC defines the window buffer 1 as allocated by defining "winiDfree[1]" as 0. At substep 1324I, the RDC copies the bottom row of the previously multirow window buffer 1 into the resized window buffer 1. At substep 1324J, the RDC defines the window buffer 1 as being displayed and visible by respectively setting "display" and "set.visible" both equal 1. At substep 1324L, the RDC then defines the active region of the window buffer 1 to encompass the resized displayed area of window buffer 1 and communicates the active region of window buffer 1 to the window manager.

Thus for example, where window buffer 1 has 4 displayed rows, referring to FIG. 12, when switching from roll-up to paint-on, in accordance with this embodiment, window buffer 1 is displayed in the 608 displayed memory and any additional window buffers, i.e., 3, 5, or 7, and associated caption are displayed over associated rows of window buffer 1. Window buffer 1 is next downsized to 1 displayed row, corresponding to the bottom row of window buffer 1.

If there are no characters in window buffer 1 then at step 1321 (FIG. 11A), the active region of window buffer 1 is reduced to zero and window buffer 1 is defined as being allocable, by getting "winidfree[1]"to 1.

Next, at step 1327, the RDC clears window 0 and F: defines window 0 as allocable by setting "winidfree[b 0]=1."

Where the current style is not "ROLL-UP", at step 1330, the RDC determines if the current caption style is not defined, i.e., no previous caption style was set. If so then at step 1333, for each row in the 608 displayed memory, the RDC 1) clears any association between a row in the 608 displayed memory and a window buffer 48; 2) defines the active regions of all window buffers to have zero area; and 3) defines all window buffers as being allocable by setting "winidfree[j]" to 1, where j=0 to 7. The next step is 1336.

At 1336, the RDC sets the current caption style to paint-on.

Resume Caption Loading Command

After the CC Thread main routine receives a command that specifies that subsequently displayed caption will be in pop-on format, the CC thread executes the resume caption loading command (hereafter "RCL") to initialize windows buffers 48 for use in a subsequent display of caption.

A suitable process for RCL is described with respect to RDC except 1) the RCL initializes window buffers 48 associated with a 608 nondisplayed memory, whereas the RDC initializes window buffers 48 associated with a 608 displayed memory; and 2) at 1336, the RDC sets the current caption style to pop-on instead of paint-on.

Preamble Address Code Command

After receiving a preamble address code command which, in accordance with EIA-608, specifies that subsequently displayed caption should be displayed at a particular row and column in the 608 displayed memory, the CC thread executes the preamble address code command (hereafter "PAC"). As specified in EIA-608, the PAC command typically follows an RCC, RCL, or RDC command.

FIGS. 13A–13E depicts the PAC. At 1503 (FIG. 13A), the PAC loads "PacData", which includes "Pacdata.row" and "Pacdata.indent" specify respectively a starting row and column for caption.

At 1506, the PAC determines the current style. If the current style is not defined, then PAC ends. If the current style is "POP-ON", then at step 1512, the PAC sets the variable "memory" to identify the 608 non-displayed memory (58.0 or 58.1). Otherwise at step 1515, PAC sets the variable "memory" to identify the 608 displayed memory.

At 1518, the PAC determines whether the current style is "ROLL-UP". If so, the next step is step 1521, otherwise, step 1523 follows.

At step 1521, the PAC stops any flashing. At step 1524, the PAC determines whether the number of displayed rows in window buffer 1, "winrows", is more than "pacdata.row". If so, at step 1527, the PAC sets "pacdata.row" equal to "winrows" to ensure all rows are displayable within the 608 displayed memory. Otherwise the next step is 1530. At step 1530 (FIG. 13B), the PAC determines whether the bottom row of window buffer 1, specified by "baserow" is the same as "pacdata.row". If not, then step 1533 follows, otherwise step 1536 follows.

At step 1533, the baserows of windows 0 and 1 are set to "pacdata.row". Next, at step 1539, the upper left coordinates of windows 0 and 1 within the respective 608 displayed and non-displayed memories 58 are updated to be positioned correctly relative to the updated "baserow" of windows 0 and 1. At 1542, the PAC redefines the upper left coordinates of the active regions of windows 0 and 1 within the 608 displayed memory to correspond to the redefined positions of windows 0 and 1 and communicates the new upper left hand corner to the window manager. The next step is 1536.

Where the current style is not "ROLL-UP", step 1523 follows, in which the PAC determines whether the current style is TEXT mode. If so, the PAC exits. Otherwise, at step 1545 (FIG. 13C), the PAC determines whether the row position, "pacdata.row", within the current area 58 specified by "memory", i.e., either the 608 displayed memory or 608 nondisplayed memory, has an associated window buffer. If so, then at step 1548, the PAC defines the associated window buffer as the window buffer in which caption is presently written into (variable "currwin"). If not, then at step 1551, the PAC counts by 2 from the value "memory" to determine a first window buffer that is free, i.e., the window buffer that has an "winidfree" =0 (hereafter "selected window buffer"). Thus in step 1551, if "memory" specifies the memory 58.0, then window buffers 1, 3, 5, and 7 are examined for availability, otherwise, windows 0, 2, 4, and 6 are examined for availability.

Where the PAC locates an unallocated window buffer that is within the range of valid window numbers, i.e., up to 7, the PAC next performs step 1554, wherein the PAC defines the priority of the selected window buffer to be higher than window buffers having a lower window number. The following table represents possible priorities for window numbers 2 to 7.

| window buffer number | priority |
|---|---|
| 2 | 8 |
| 3 | 11 |
| 4 | 14 |

-continued

| window buffer number | priority |
|---|---|
| 5 | 17 |
| 6 | 20 |
| 7 | 23 |

Figure 13A:
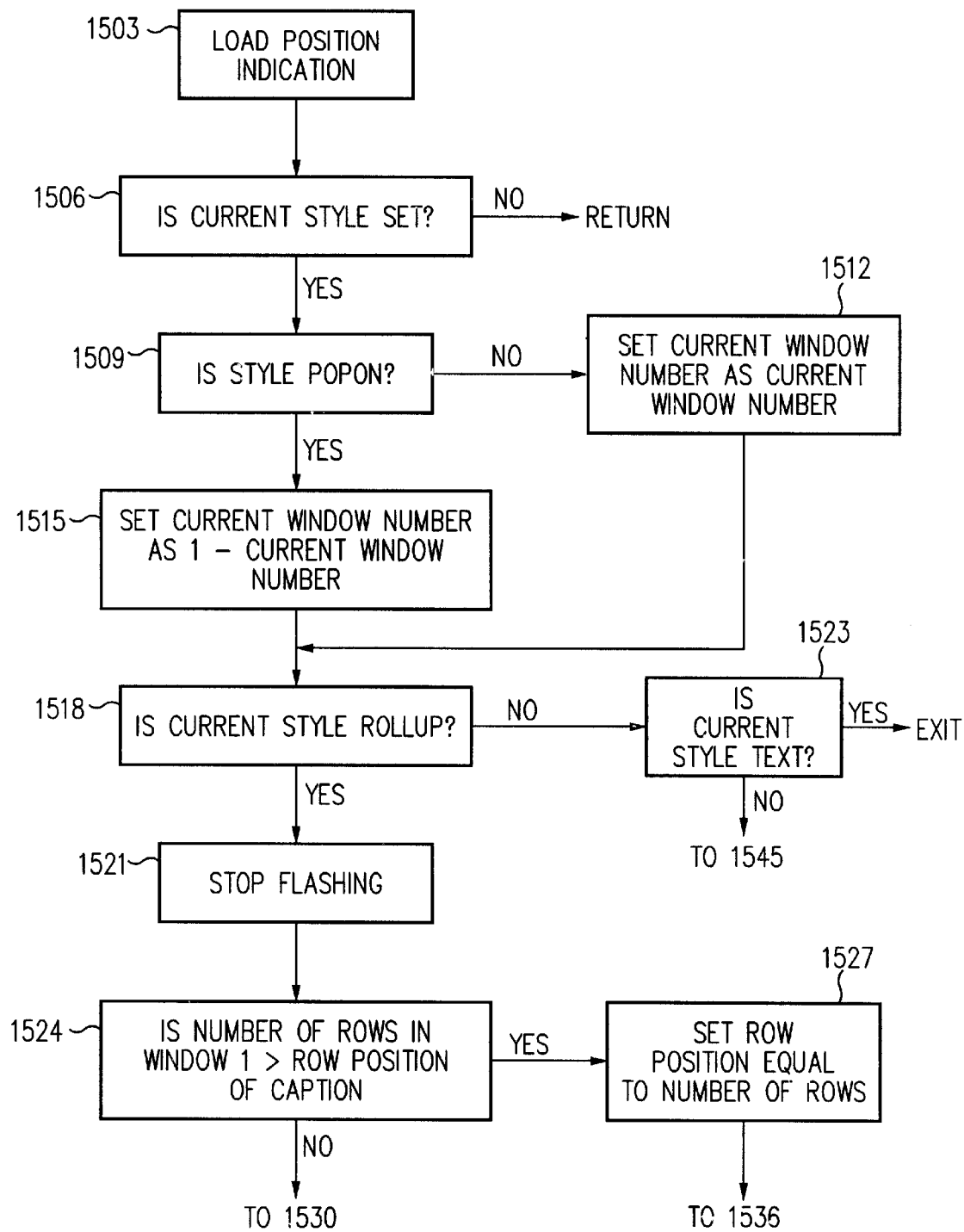
FIGS. 13A–13E and 14 are flow diagrams of portions of a closed caption decoder according to one embodiment of the present invention.
Figure 13B:
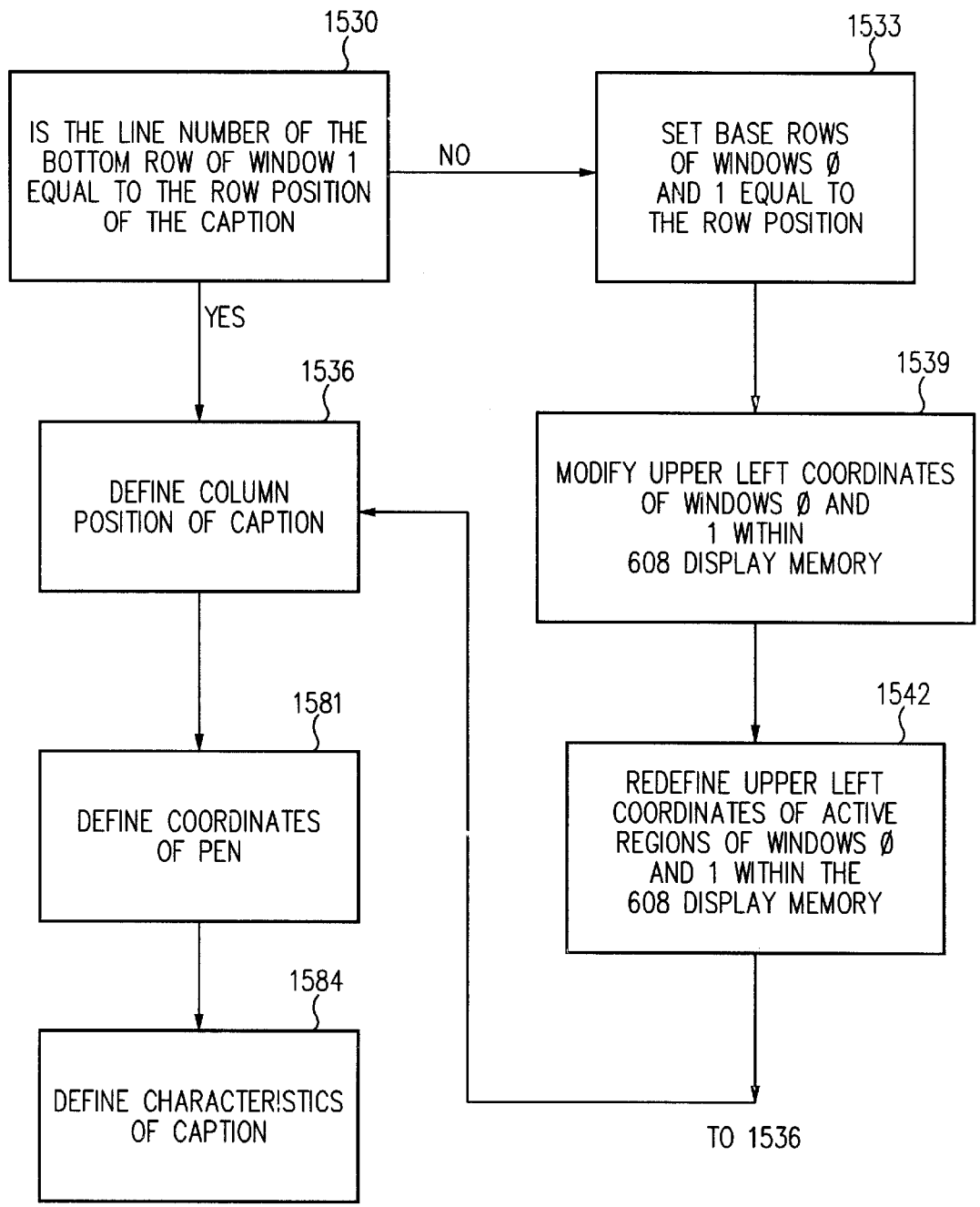
Figure 13C:
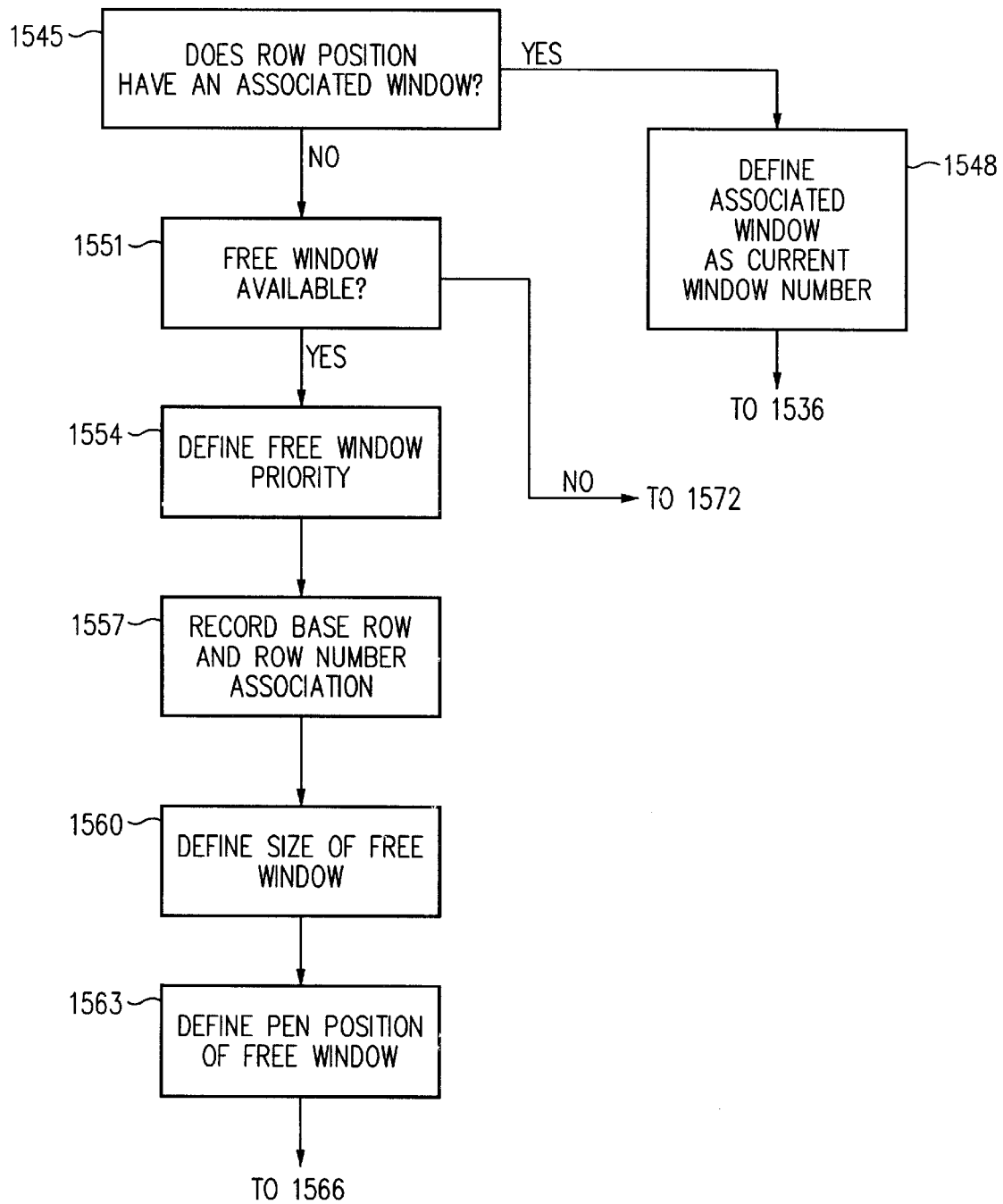
Figure 13D:
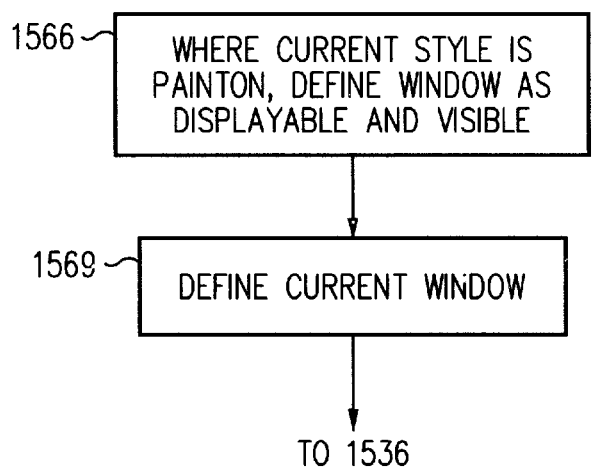
Figure 13E:
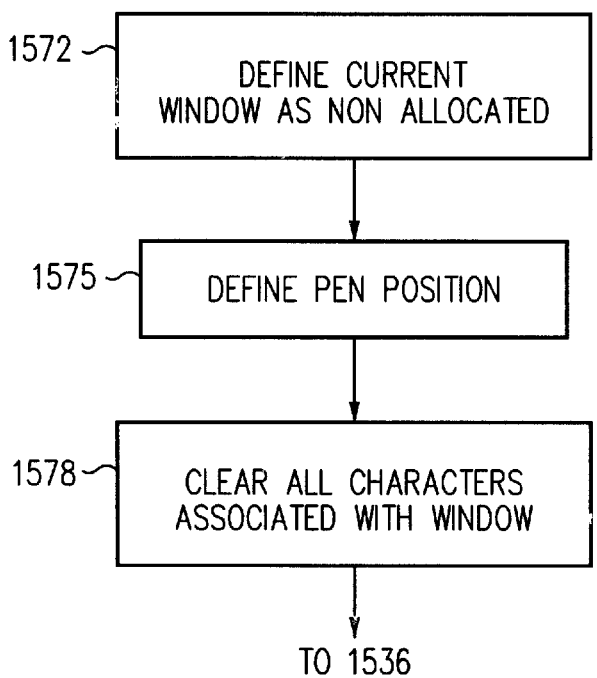

The PAC then instructs the window manager of the priority of the selected window buffer. At step 1557, the PAC associates the base row of the selected window buffer with the desired row location of caption, "pacdata.row", and then stores the associated window and row number in "Ccrow". At 1560, the PAC defines the selected window buffer as having 1 displayable row. At 1563 the PAC defines the initial pen position for the window buffer at the leftmost space in the displayable row of the selected window buffer. At 1566 (FIG. 13D), where the style is "PAINT-ON", the PAC defines the selected window buffer as displayable and visible by respectively setting both "display" and "visible" to 1. At 1569, the PAC informs the window manager the selected window buffer is to be the currently active window buffer by setting variable "currwin" equal to the selected window buffer number.

Where the PAC does not locate an available window buffer, the PAC next performs step 1572 (FIG. 13E). At step 1572, the PAC invalidates the currently active window buffer, specified by "currwin", and blanks its contents. At step 1575, the PAC defines the pen position to be at the left most position in the invalidated window buffer. At step 1578, the PAC clears all characters in the currently active window buffer by marking all characters as invalid.

Next at step 1536, the PAC defines the column position, and characteristics of the caption defined by the input caption such as background and foreground opacity and character appearance. At step 1581, the PAC defines the starting column position of the pen as being "pacdata.indent", the specified column indent of the pen. The PAC further defines the (x,y) coordinates of the pen. At step 1584, the PAC defines characteristics of the caption defined by the input caption such as color, underlining, italics, and color.

End of Caption After receiving an EIA-608 "end of caption" command, the CC thread executes the end of caption command (hereafter "EOC"). The EOC command typically follows an RCL, RDC, or RCC command. The EOC is used to toggle between 608 displayed and nondisplayed memories. Also, the EOC forces the TV receiver into pop-on style if no Resume Caption Loading command has been received which would do so. Pop-on uses windows 0 to 7, i.e., windows associated with both the 608 displayed and nondisplayed memories. Paint-on uses windows associated with the 608 displayed memory.

Figure 14:
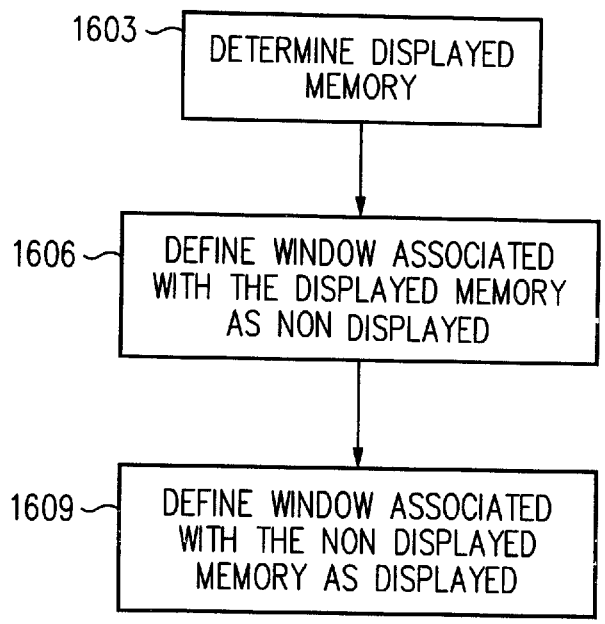

A suitable process includes the RCL process described earlier and additional steps that FIG. 14 depicts.

At step 1603, the EOC determines whether memory 58.0 or 58.1 is the 608 displayed memory by accessing variable "displayedmemory". If "displayedmemory" is 1, memory 58.1 is displayed, otherwise, memory 58.0 is displayed.

At step 1606, beginning with the lowest numbered window associated with the displayed memory, i.e., 0 or 1, and counting by 2 up to 7, for each window that is defined and visible, the EOC sets the displayed width, "windisp.width", to zero, as well as "visible" and "display" each to zero.

At step 1609, beginning with the lowest numbered window associated with the nondisplayed memory, i.e., 1 or 0, and counting by 2 up to 7, for each window that is defined, the EOC resets the active region width, "windisp.width", to the width of the window, "winsize.width" and sets "visible" and "display" each to one. Thereby in step 1609, the EOC defines the 608 non-displayed memory as displayed memory.

Figure 15:
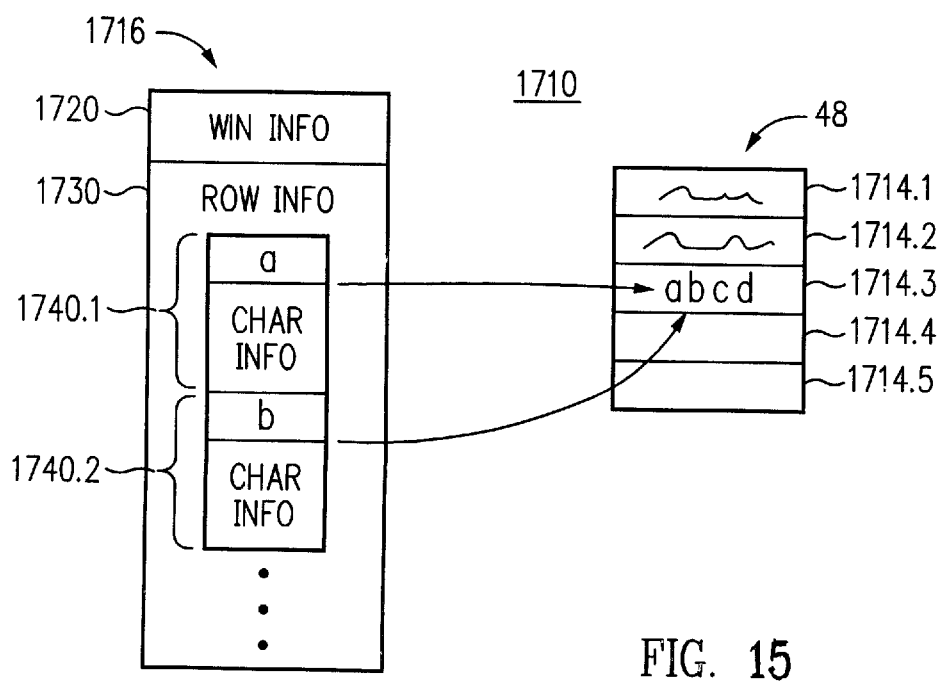
FIG. 15 diagrams data structures in one embodiment of the present invention.

FIG. 15 illustrates data structures 1710 maintained in memory 44 for each buffer 48 (that is, each buffer 48.0–48.7). One of these structures is the buffer 48 itself, which is a pixel map for a corresponding window 18. The buffer has five rows 1714.1–1714.5. In some embodiments, the exact position of which row 1714 depends on the font size of the caption characters.

For each buffer 48, a data structure 1716 includes "window information" 1720 for the corresponding window buffer 48. Window information structure 1720 includes a window ID and the ID of the window corresponding to the "paired" buffer used for flashing as described above. For example, if buffer 48 is buffer 48.0, the "paired" buffer is buffer 48.1. If buffer-48 is buffer 48.6, the "paired" buffer is the buffer 48.7.

Window information 1720 also identifies the window priority, the buffer 48 active region, the pen position, the pen attributes, the scrolling and flashing state (whether the window is scrolling or any characters in the window are flashing), and other suitable information.

Structure 1716 also includes row information 1730. For 708 data, row information 1730 stores information for the bottom row to which the caption is being written. In FIG. 15, this row is row 1714.3. For each character in the row, a data structure 1740 is maintained. Two such structures 1740.1, 1740.2 are shown in FIG. 15, for the first two characters "ab" in row 1714.3. Besides the value of the character ("a" or "b"), each structure 1740 identifies the character position, font, the background and foreground colors, the background and foreground opacity.

For the 608 display (FIGS. 5, 6), it is desirable to store the information not only for the base row of caption (such as rows L1, NL1 in FIG. 5), but for all the rows. One reason for that is, in the 608 paint-on style, a new caption character can be written into any row, for example, into row L2 in FIG. 5. When a new character is written, it may be desirable to write a solid space before or after the character to improve visibility. However, if another character appears before or after the new character, the solid space should not be written because the solid space would override the other character. Therefore, the row information is desired for row L2.

In some embodiments, in the paint-on and pop-on style, memory 44 stores the row information on every row of the 608 caption. The information is stored in the structure 1730 of the buffer 48 storing the row itself. Thus, in FIG. 5, the information on row L1 is stored in structure 1730 of buffer 48.3, the information on row L2 is stored in structure 1730 of buffer 48.1, the information on row NL4 is stored in structure 1730 of buffer 48.4, and so on.

In the roll-up mode, the new caption is written into the base row L1 (FIG. 6) and, possibly into the corresponding row FL1 for flashing. Therefore, the information on the other rows L2, L3, L4, FL2, FL3, FL4 is not needed. However, the information on rows L2, L3, L4 may become needed if the style is switched to paint-on. Therefore, the row information for rows L4, L3, L2, L1 is kept in the structures 1730 of respective buffers 48.7, 48.5, 48.3, 48.1. The row information for row FL1 is stored in structure 1730 of buffer 48.0.

Smooth Scrolling.

FIGS. 10A–10C illustrate smooth scrolling for 708 data. These figures were used above to illustrate non-smooth completion of scrolling ("preemption") for the RCC command. However, smooth scrolling is similar. When a window 18 on screen 20 is being scrolled, smooth scrolling is performed on the pair of buffers 48 corresponding to the window 18 (for example, a pair of buffers 48.1, 48.0, or a pair of buffers 48.3, 48.2, and so on).

In the example of FIGS. 10–10C, the active region 1204 of a buffer 48 is four rows. In smooth scrolling, the active region is gradually shifted down (by 1 pixel or a number of pixels, at regular intervals) from the top of buffer 48 until the active region 1204 includes rows 2–5 of the buffer (FIG. 10B).

When the active region includes rows 2–5, the active region is copied into the pixmap (not shown), and then from the pixmap into the first four rows 1212 (FIG. 10C) of the buffer 48. Then the active region is set to coincide with region 1212.

If new caption characters arrive during scrolling (at the stage of FIG. 11A), they are written into the fifth row of buffer 48 so that the fifth row smoothly moves up into the window 18 on screen 20.

In some embodiments, if characters start arriving for the next row below the fifth row before scrolling is completed, the scrolling is preempted (that is, completed non-smoothly) as described above in connection with the RCC command.

For the 608 data, smooth scrolling is similar. Buffers 48.1, 48.0 are scrolled simultaneously. In some embodiments, the fifth row of buffer 48 is not used. Data structures 1730 of buffers 48.1, 48.3, 48.5, 48.7 keep row information for four 608 caption rows of 608 memory 58.0. Some embodiments do not keep row information for a fifth row that could be scrolled smoothly into the 608 display. In some embodiments, if a character arrives for the next row while the preceding four rows are being scrolled in roll-up style, scrolling is preempted.

Other embodiments do not preempt scrolling in this case. A new row of the 608 caption is scrolled smoothly into the display, as for 708 caption. Some embodiments include an additional structure 1730 for an extra row of the 608 caption.

Some embodiments include additional data structures for more than five rows, for example, for six rows. Each buffer 48 has six rows. If caption characters are received for the fifth and sixth rows during scrolling, scrolling is not preempted but is continued smoothly.

The above-described embodiments are illustrative and not limiting. The invention is not limited to the 608 or 708 standards, the number or size of memory buffers or other data structures or windows, to multi-threaded software, or to any other software or hardware parameters. The invention is not limited to scrolling up. Scrolling down, left, right, or in same other if direction is done in some embodiments. Changes and modifications may be made without departing from this invention. For example, hardwired logic can replace software. Therefore, the appended claims encompass all such changes and modifications as fall within the scope of this invention.

What is claimed is:

1. A method for displaying closed caption data, the method comprising:

storing caption data in a first memory buffer;

storing the caption data, but with at least one character omitted, in a second memory buffer;

repeatedly displaying the first and second buffers in succession, one after the other, so that the at least one character omitted from the second buffer is displayed flashing.

2. The method of claim 1 wherein repeatedly displaying the first and second buffers comprises:

assigning different priorities to the first and second buffers;

providing the priorities to a window manager which displays each buffer in a window, wherein when displaying any overlapping windows corresponding to any two or more buffers the window manager displays a window corresponding to a buffer of a higher priority where the windows overlap;

repeatedly changing the priorities so that, repeatedly, the first buffer has a higher priority than the second buffer and then the second buffer has a higher priority than the first buffer, to cause the window manager to display, repeatedly, the first buffer and then the second buffer.

3. An apparatus for processing closed caption data, the apparatus comprising:

means for storing caption data in a first memory buffer, and for storing the caption data, but with at least one character omitted, in a second memory buffer;

means for repeatedly displaying the first and second buffers in succession, one after the other, so that the at least one character omitted from the second buffer is displayed flashing.

4. The apparatus of claim 3 wherein the means for displaying comprises:

means for assigning different priorities to the first and second buffers;

means for providing the priorities to a window manager which displays each buffer in a window, wherein when displaying any overlapping windows corresponding to any two or more buffers the window manager displays a window corresponding to a buffer of a higher priority where the windows overlap;

means for repeatedly changing the priorities so that, repeatedly, the first buffer has a higher priority than the second buffer and then the second buffer has a higher priority than the first buffer, to cause the window manager to display, repeatedly, the first buffer and then the second buffer.

5. A computer readable medium comprising one or more computer instructions for:

storing caption data in a first memory buffer;

storing the caption data, but with at least one character omitted, in a second memory buffer;

repeatedly displaying the first and second buffers in succession, one after the other, so that the at least one character omitted from the second buffer is displayed flashing.

6. The computer readable medium of claim 5 wherein repeatedly displaying the first and second buffers comprises:

assigning different priorities to the first and second buffers;

providing the priorities to a window manager which displays each buffer in a window, wherein when displaying any overlapping windows corresponding to any two or more buffers the window manager displays a window corresponding to a buffer of a higher priority where the windows overlap;

repeatedly changing the priorities so that, repeatedly, the first buffer has a higher priority than the second buffer and then the second buffer has a higher priority than the first buffer, to cause the window manager to display, repeatedly, the first buffer and then the second buffer.

7. A method for displaying closed caption, the method comprising:

providing a plurality of memory buffers for storing caption data, wherein at least one of the buffers can store more than one rows of caption data, and wherein consecutive rows of each buffer are to be displayed contiguously;

if caption data conform to a first format, then storing a plurality of rows of caption data in one of the buffers and displaying the one of the buffers;

if caption data conform to a second format which allows different rows of caption to be displayed non-contiguously, then storing each of a plurality of rows of caption data in a separate one of the buffers, and displaying one row of each of two or more buffers that store the caption data, to enable different rows to be displayed non-contiguously.

8. The method of claim 7 wherein the first format is the EIA-708 standard and the second format is the EIA-608 standard.

9. An apparatus for processing closed caption, the apparatus comprising:

means for providing a plurality of memory buffers for storing caption data, wherein at least one of the buffers can store more than one rows of caption data, and wherein consecutive rows of each buffer are to be displayed contiguously;

means for storing a plurality of rows of caption data in one of the buffers and displaying the one of the buffers if caption data conform to a first format, and if caption data conform to a second format which allows different rows of caption to be displayed non-contiguously, then storing each of a plurality of rows of caption data in a separate one of the buffers, and displaying one row of each of two or more buffers that store the caption data, to enable different rows to be displayed non-contiguously.

10. The apparatus of claim 9 wherein the first format is the EIA-708 standard and the second format is the EIA-608 standard.

11. A computer readable medium comprising one or more computer instructions for:

providing a plurality of memory buffers for storing caption data, wherein at least one of the buffers can store more than one rows of caption data, and wherein consecutive rows of each buffer are to be displayed contiguously;

if caption data conform to a first format, then storing a plurality of rows of caption data in one of the buffers and displaying the one of the buffers;

if caption data conform to a second format which allows different rows of caption to be displayed non-contiguously, then storing each of a plurality of rows of caption data in a separate one of the buffers, and displaying one row of each of two or more buffers that store the caption data, to enable different rows to be displayed non-contiguously.

12. The computer readable medium of claim 11 wherein the first format is the EIA-708 standard and the second format is the EIA-608 standard.

* * * * *